(12) United States Patent
Yasuzawa et al.

(10) Patent No.: US 12,522,678 B2
(45) Date of Patent: Jan. 13, 2026

(54) ZWITTERION COMPOUND AND PRODUCTION METHOD AND USE FOR SAME

(71) Applicant: TOKUSHIMA UNIVERSITY, Tokushima (JP)

(72) Inventors: Mikito Yasuzawa, Tokushima (JP); Tsubasa Miki, Tokushima (JP); Yukihiro Arakawa, Tokushima (JP); Yasushi Imada, Tokushima (JP); Hitoshi Matsuki, Tokushima (JP)

(73) Assignee: TOKUSHIMA UNIVERSITY, Tokushima (JP)

( * ) Notice: Subject to any disclaimer, the term of this patent is extended or adjusted under 35 U.S.C. 154(b) by 826 days.

(21) Appl. No.: 17/780,315

(22) PCT Filed: Nov. 27, 2020

(86) PCT No.: PCT/JP2020/044365
§ 371 (c)(1),
(2) Date: Jun. 29, 2022

(87) PCT Pub. No.: WO2021/107141
PCT Pub. Date: Jun. 3, 2021

(65) Prior Publication Data
US 2023/0022585 A1    Jan. 26, 2023

(30) Foreign Application Priority Data
Nov. 29, 2019    (JP) .................................. 2019-215921

(51) Int. Cl.
*C08F 20/36* (2006.01)
*A61L 27/16* (2006.01)
(Continued)

(52) U.S. Cl.
CPC .............. *C08F 20/36* (2013.01); *A61L 27/16* (2013.01); *A61L 27/34* (2013.01); *C08F 20/18* (2013.01);
(Continued)

(58) Field of Classification Search
None
See application file for complete search history.

(56) References Cited

U.S. PATENT DOCUMENTS

2013/0216950 A1* 8/2013 Sato ..................... G03F 7/3035
430/285.1
2017/0355799 A1  12/2017 Veiseh et al.

FOREIGN PATENT DOCUMENTS

| CA | 1167838 A | 5/1984 |
|----|-----------|--------|
| JP | 56152816 A | 11/1981 |

(Continued)

OTHER PUBLICATIONS

Yu et al., "ATRP synthesis of poly(2-(methacryloyloxy)ethyl choline phosphate): a multivalent universal biomembrane adhesive", Chemical Communications, 2013, vol. 49, No. 61, pp. 6831-6833.
(Continued)

*Primary Examiner* — Richard A. Huhn
(74) *Attorney, Agent, or Firm* — MH2 Technology Law Group, LLP

(57) ABSTRACT

An object is to provide a zwitterionic compound having an excellent protein adsorption inhibitory effect. The zwitterionic compound is a polymer comprising a unit represented by the following formula (1):
(Continued)

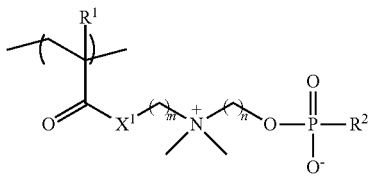

(1)

wherein $R^1$ is a hydrogen atom or a methyl group, $R^2$ is OH or $O^-$, $X^1$ is —O— or —N($Q^1$)-, $Q^1$ is a hydrogen atom or a $C_{1-6}$ alkyl group, m is an integer of 1 to 12, and n is an integer of 1 to 4.

5 Claims, 9 Drawing Sheets

(51) Int. Cl.
*A61L 27/34* (2006.01)
*C08F 20/18* (2006.01)
*C08F 30/02* (2006.01)
*C08J 5/18* (2006.01)
*C08L 43/02* (2006.01)

(52) U.S. Cl.
CPC .................. *C08F 30/02* (2013.01); *C08J 5/18* (2013.01); *A61L 2400/18* (2013.01); *C08J 2333/10* (2013.01); *C08J 2333/14* (2013.01); *C08L 43/02* (2013.01)

(56) References Cited

FOREIGN PATENT DOCUMENTS

| JP | 59199696 A | 11/1984 |
| JP | 63086704 A | 4/1988 |
| JP | 2014520191 A | 8/2014 |
| JP | 2014193951 A | * 10/2014 |
| WO | 2012175923 A1 | 12/2012 |

OTHER PUBLICATIONS

Hu et al., "A facile approach to hydrophilic, reverse zwitterionic, choline phosphate polymers", Polymer Chemistry, 2015, vol. 6, No. 4, pp. 525-530.
C. Dessemond (Examiner), Extended European Search Report dated Nov. 21, 2023 for European Application No. 20892120.5, 12 pages.
International Search Report dated Jan. 26, 2021 for International Application No. PCT/JP2020/044365, 6 pages with English translation.
Kusumi et al., "Dynamic and Structural Properties of Polymerized Phosphatidylcholine Vesicle Membranes", Journal of the American Chemical Society, 1983, vol. 105, No. 10, pp. 2975-2980.
Holmlin et al., "Zwitterionic SAMs that Resist Nonspecific Adsorption of Protein from Aqueous Buffer", Langmuir, 2001, vol. 17, pp. 2841-2850.
Vaisocherová et al., "Functionalizable surface platform with reduced nonspecific protein adsorption from full blood plasma—Material selection and protein immobilization optimization", Biosensors and Bioelectronics, 2009, vol. 24, pp. 1924-1930.

* cited by examiner

Fig. 2

| Slide Glass | Si-p(MPC) | Si-p(MCHP) |
|---|---|---|
| 46.3±0.4° | 37.8±3.6° | 22.7±4.3° |

Static water contact angle

Fig. 3
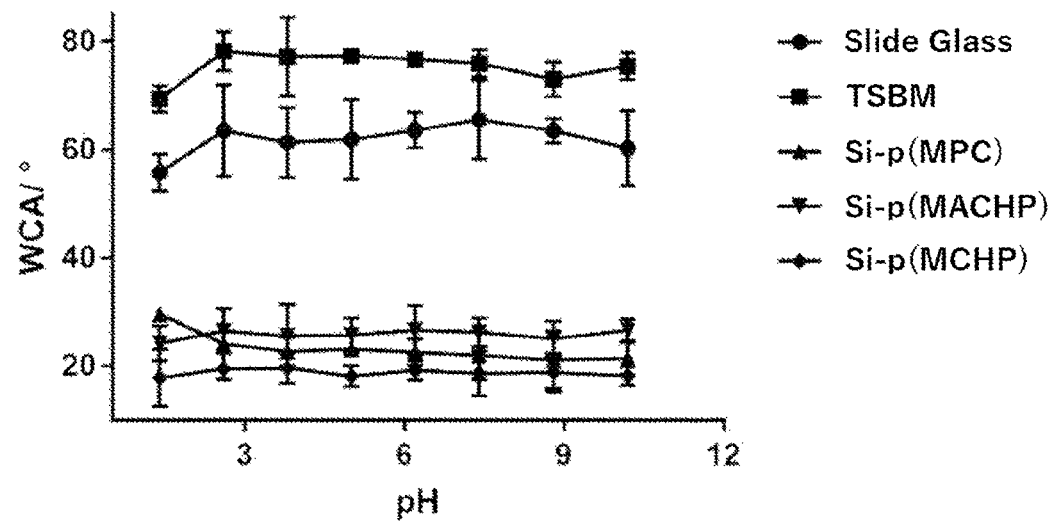
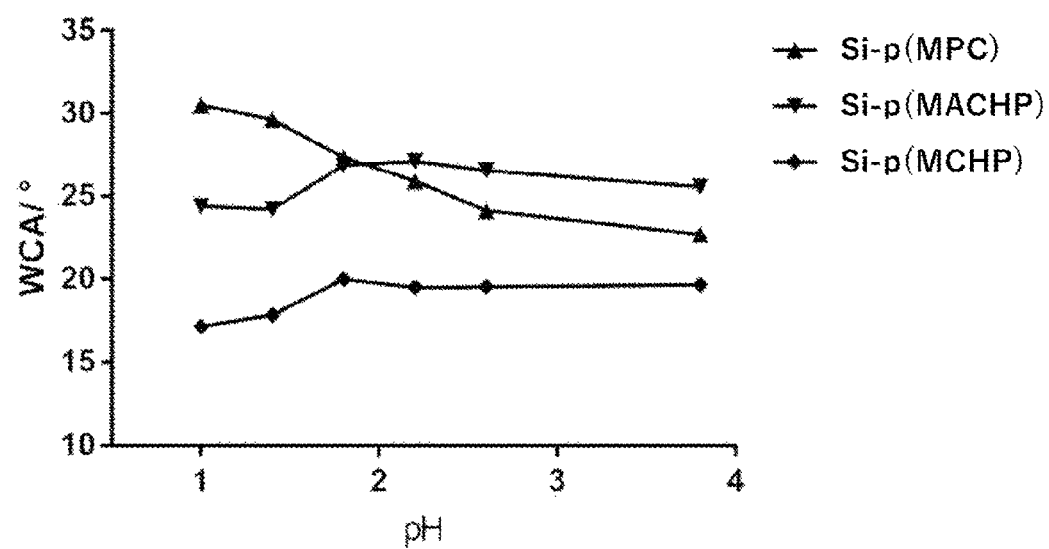

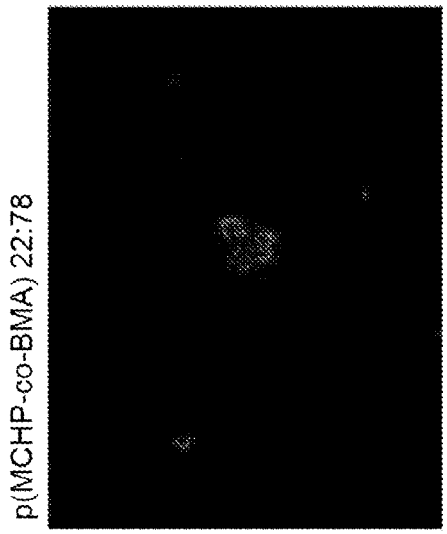
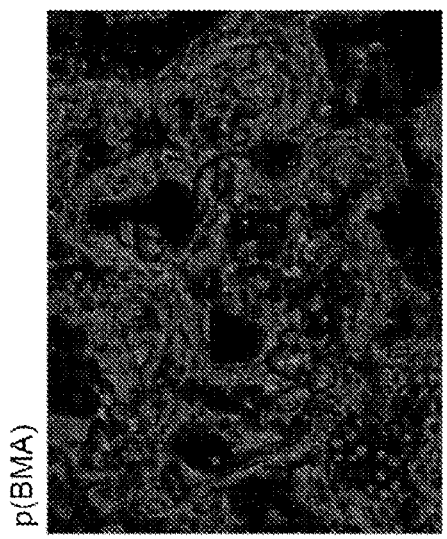
Fig. 8

ZWITTERION COMPOUND AND PRODUCTION METHOD AND USE FOR SAME

CROSS-REFERENCE TO RELATED APPLICATIONS

This application is a U.S. National Stage application of International Application No. PCT/JP2020/044365 filed 27 Nov. 2020, which claims priority to Japanese Application No. 2019-215921 filed 29 Nov. 2019, the entire disclosures of which are hereby incorporated by reference in their entireties.

TECHNICAL FIELD

The present invention relates to a zwitterionic compound, a method for producing the zwitterionic compound, and use of the zwitterionic compound.

BACKGROUND ART

Due to medical progress, many artificial medical materials, such as artificial organs, have recently been developed. For artificial medical materials, it is important not to cause undesirable biological reactions in vivo.

Organisms have a self-defense response system for recognizing and responding to foreign matter. For example, when blood vessels are damaged, and blood comes into contact with exposed subendothelial tissue, a blood-clotting reaction proceeds immediately. Such a foreign matter recognition response of blood is also triggered when the blood comes into contact with an artificial medical material; proteins adsorb to the surface of the artificial medical material to form a layer, and cells, such as platelets, adsorb to this layer and undergo extension and denaturation, resulting in the formation of a blood clot. For this reason, the surface of artificial medical materials used in vivo must have properties for inhibiting protein adsorption.

It is typically considered that materials having a protein adsorption inhibitory effect must have four surface characteristics, i.e., (1) being hydrophilic, (2) being electrically neutral, (3) being a hydrogen bond receptor, and (4) not being a hydrogen bond donor (Non-patent Literature (NPL) 1).

Although the principle of protein adsorption on a material surface has not been completely identified, the major cause is believed to be energetic interactions that occur when proteins approach the interface. The major protein-interface interactions include van der Waals forces, electrostatic attraction, and hydrogen bond.

On a hydrophobic surface, high interfacial free energy exists between the aqueous solution and a protein; thus, to eliminate this energy, protein adsorption to the interface is promoted. In contrast, (1) on a hydrophilic surface, the interfacial free energy is low, and protein adsorption is thus suppressed.

When the material surface is (2) electrically neutral, electrostatic interactions between a protein and the interface is suppressed. Also, when the material surface (3) is a hydrogen bond receptor and (4) is not a hydrogen bond donor, hydrogen bond interaction is suppressed.

Accordingly, material surfaces having the four characteristics described above can reduce the energetic interactions that occur when proteins approach the interface, and are thus believed to have a protein adsorption inhibitory effect.

Polymers are useful materials for inhibiting protein adsorption; in particular, polyethylene glycol (PEG) has been used for a long time. Materials with a surface onto which water-soluble PEG chains are grafted can suppress protein adsorption on the surface by repelling approaching proteins with hydrated PEG chains. However, PEG chains are easily degraded by oxidation and are not suitable for long-term stable use in vivo (NPL 1). Therefore, materials that are not easily degraded in vivo and that have a high protein adsorption inhibitory effect are required.

2-Methacryloyloxyethyl phosphorylcholine (MPC) is a monomer created from the above requirements and is a material that mimics phosphatidylcholine, which is a phospholipid and is a component of cell membranes, as shown in the following formulas (NPL 2).

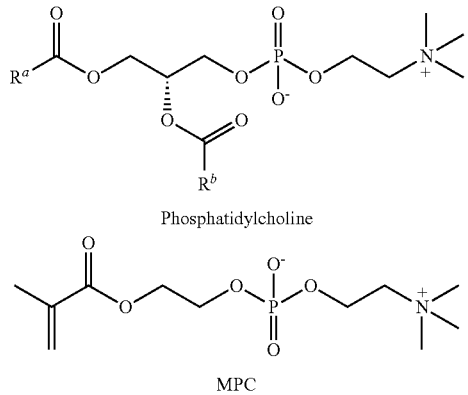

Phosphatidylcholine

MPC

Polymers obtained by polymerization of MPC as a monomer have the four characteristics described above due to a zwitterionic group, i.e., a phosphorylcholine (PC) group, and have a protein adsorption inhibitory effect.

CITATION LIST

Non-Patent Literature

NPL 1: Holmlin, R. E. et al., Langmuir 2001, 17, pp. 2841-2850
NPL 2: Vaisocherova, H. et al., Biosens. Bioelectron. 2009, 24, pp. 1924-1930

SUMMARY OF INVENTION

Technical Problem

A material with an even better protein adsorption inhibitory effect than that of polymers obtained by polymerization of MPC as a monomer is required. Further, the present inventors found that polymers obtained by polymerization of MPC as a monomer have a problem; specifically, a decrease in the pH causes a reduction in the hydrophilicity, adversely affecting the protein adsorption inhibitory effect.

Therefore, an object of the present invention is to provide a zwitterionic compound having an excellent protein adsorption inhibitory effect, in particular, an excellent protein adsorption inhibitory effect in a broad pH range, including the acidic pH range.

Solution to Problem

The present inventors conducted extensive research to solve the above problems, and found that the use of a monomer having a structure in which the quaternary ammonium cation group and the phosphodiester group are replaced by each other in the PC group in MPC improves the protein adsorption inhibitory effect of the resulting polymer. The inventors also found that polymers obtained using a monomer having the above structure have high hydrophilicity even when the pH decreases, and have an excellent protein adsorption inhibitory effect over a wide pH range, including the acidic range. The inventors further found that polymers obtained using a monomer having the above structure have excellent compatibility with body sites that become locally acidic (e.g., inflammatory sites and cancer-developing sites). Based on these findings, the inventors conducted further research to complete the present invention.

More specifically, the present invention encompasses the following embodiments.

Item 1.

A polymer comprising a unit represented by the following formula (1):

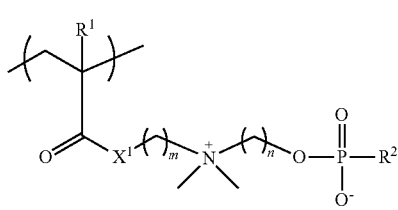

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
wherein the percentage of the unit is more than 90 mol % based on the total monomer units.

Item 2.

A polymer comprising a unit represented by the following formula (1):

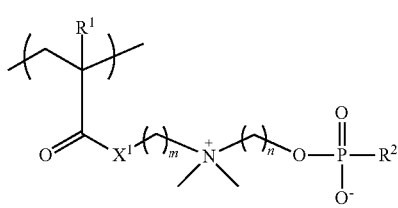

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4, and a unit represented by the following formula (2):

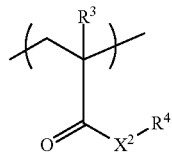

wherein
$R^3$ is a hydrogen atom or a methyl group, and $R^4$ is a $C_{3-16}$ alkyl group, or
$R^3$ is —CO—$X^2$—$R^4$ or —$CH_2$—CO—$X^2$—$R^4$, and $R^4$ is a $C_{1-16}$ alkyl group,
$X^2$ is —O— or —N($Q^2$)-, and
$Q^2$ is a hydrogen atom or a $C_{1-6}$ alkyl group.

Item 2a.

A polymer comprising a unit represented by the following formula (1):

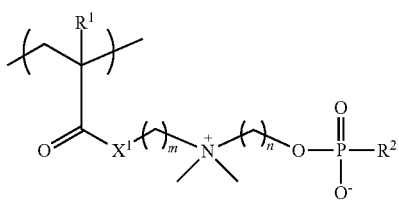

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4, and
an additional monomer unit containing an ethylenically unsaturated double bond,
wherein the percentage of a methyl methacrylate unit is 10 mol % or less or 5 mol % or less, based on the total monomer units.

Item 2b.

The polymer according to Item 2a, which does not comprise the methyl methacrylate unit.

Item 2c.

The polymer according to Item 2b, wherein the percentage of an ethyl methacrylate unit is 10 mol % or less or 5 mol % or less, based on the total monomer units.

Item 2d.

The polymer according to Item 2b or 2c, which does not comprise the ethyl methacrylate unit.

Item 2e.

The polymer according to any of Items 2a to 2d, wherein the molar ratio of the unit represented by formula (1) and the additional monomer unit containing an ethylenically unsaturated double bond is 10:90 to 40:60.

Item 3.

The polymer according to Item 2, wherein the molar ratio of the unit represented by formula (1) and the unit represented by formula (2) is 10:90 to 40:60.

Item 4.

A film or sheet containing a polymer comprising a unit represented by the following formula (1):

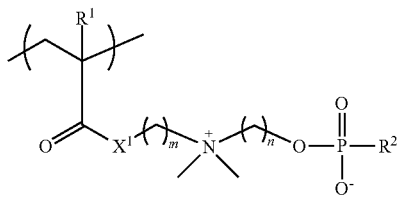

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4.

Item 4a.

A film or sheet containing a polymer of any one of Items 1 to 3 and 2a to 2e.

Item 5.

A biocompatible material containing a polymer comprising a unit represented by the following formula (1):

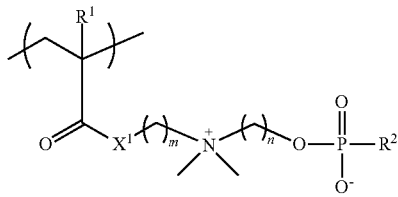

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4.

Item 5a.

A biocompatible material containing a polymer of any one of Items 1 to 3 and 2a to 2e.

Item 5b.

A method for imparting biocompatibility to a material or enhancing biocompatibility of a material, the method comprising applying a polymer comprising a unit represented by the following formula (1):

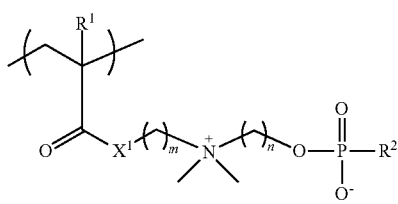

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
to a surface of the material.

Item 5c.

A method for imparting biocompatibility to a material or enhancing biocompatibility of a material, the method comprising applying the polymer of any one of Items 1 to 3 and 2a to 2e to a surface of the material.

Item 5d.

The method according to Item 5b or 5c, wherein the material is a medical material.

Item 5e.

Use of a polymer comprising a unit represented by the following formula (1):

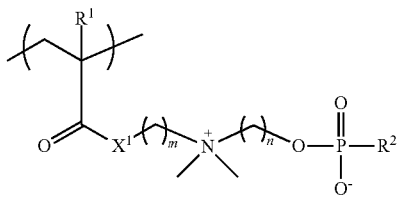

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
for imparting biocompatibility to a material or enhancing biocompatibility of a material.

Item 5f.

Use of the polymer of any one of Items 1 to 3 and 2a to 2e for imparting biocompatibility to a material or enhancing biocompatibility of a material.

Item 5g.

The use according to Item 5e or 5f, wherein the material is a medical material.

Item 6.

The biocompatible material according to Item 5 or 5a, which is a surface-covering material for a medical material.

Item 7.

A polymer brush containing a base material and a polymer layer formed of multiple polymer chains each of whose one end is fixed to the base material and the other end is a free end,
wherein
the multiple polymer chains comprise a polymer comprising a unit represented by the following formula (1):

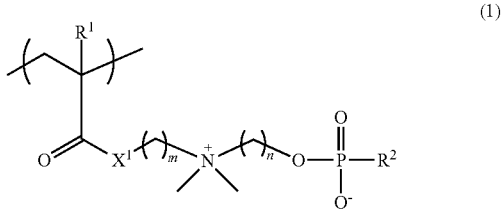

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4.

Item 7a.

A polymer brush containing the polymer of any one of Items 1 to 3 and 2a to 2e.

Item 8.

A method for producing a compound represented by the following formula:

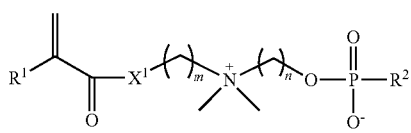

(3)

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
the method comprising reacting
a compound represented by the following formula:

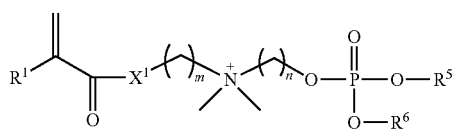

(4)

wherein
$R^5$ and $R^6$ are the same or different, and are each independently an alkyl group, and
$R^1$, $X^1$, m, and n are as defined above,
with
a compound represented by the following formula (5):

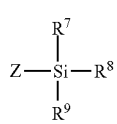

(5)

wherein
$R^7$ to $R^9$ are the same or different, and are each independently an alkyl group, and
Z is a halogen atom,
followed by a reaction with water and/or an alcohol.

Item 9.

A method for producing a compound represented by the following formula:

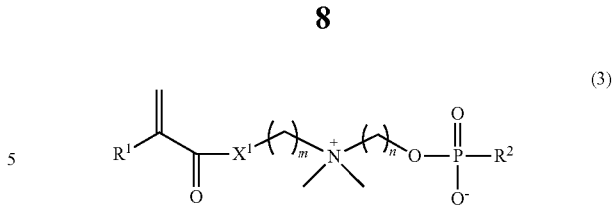

(3)

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
the method comprising reacting
a compound represented by the following formula:

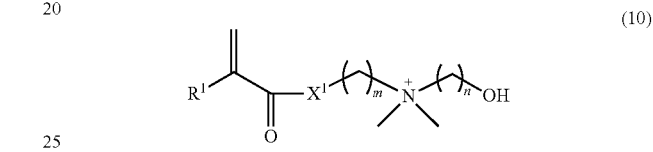

(10)

wherein
$R^1$, $X^1$, m, and n are as defined above,
with
$POCl_3$ or $P_2O_5$,
followed by hydrolyzation.

Advantageous Effects of Invention

The zwitterionic compound of the present invention has an excellent protein adsorption inhibitory effect. In particular, the zwitterionic compound of the invention can exhibit an effect of suppressing protein adsorption over a wide pH range, including the acidic range.

BRIEF DESCRIPTION OF DRAWINGS

FIG. 2 shows the measurement results of the contact angle against water for the polymer brushes of the Examples.

FIG. 3 shows the measurement results of the contact angle against buffer for the polymer brushes of the Examples.

FIG. 8 are micrographs showing that the films of the Examples have a protein adsorption inhibitory effect.

DESCRIPTION OF EMBODIMENTS

Zwitterionic Compound

Figure 1:
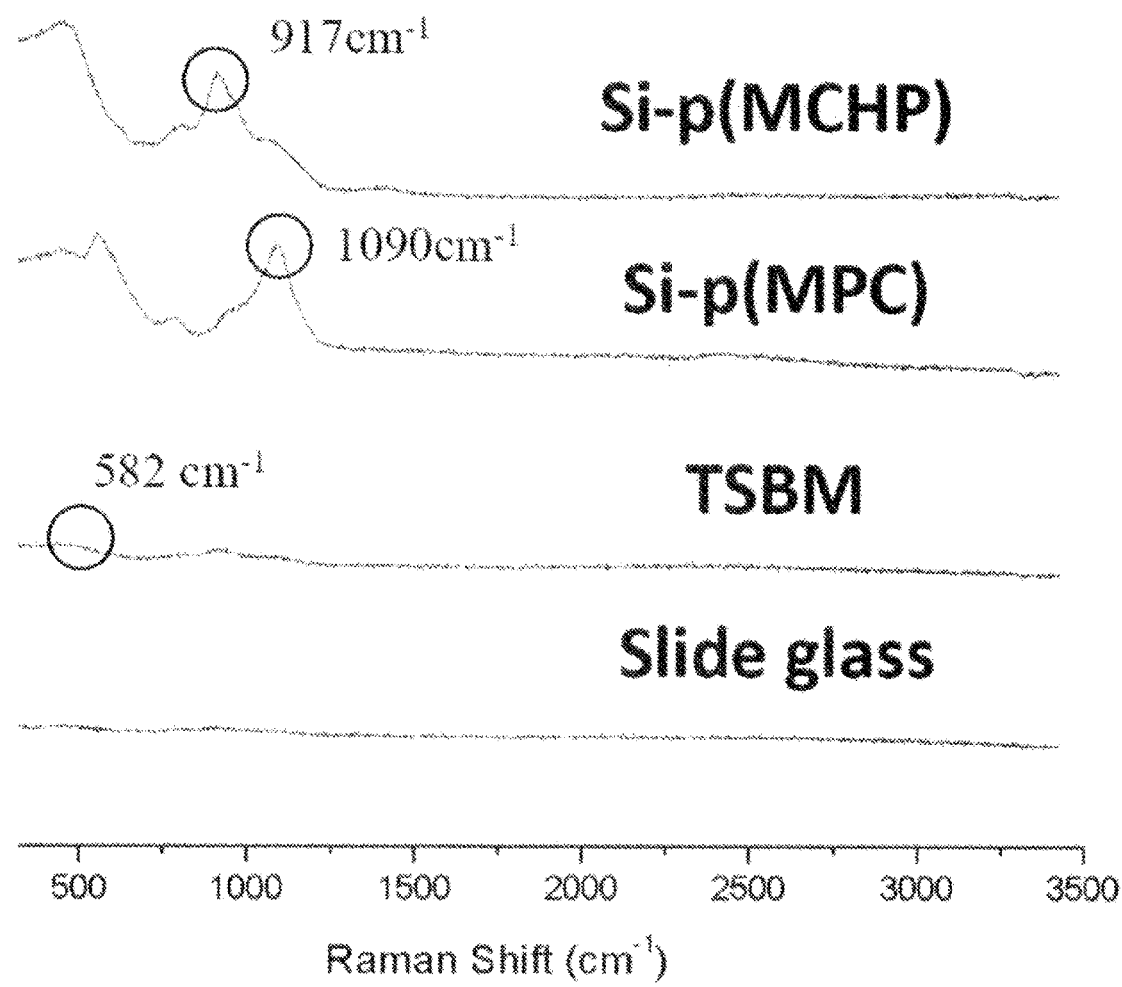
FIG. 1 shows the Raman spectrum measurement results of the polymer brushes of the Examples.

In one embodiment, the zwitterionic compound is a polymer comprising a unit represented by the following formula (1):

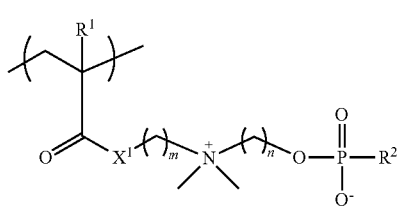

wherein $R^1$, $R^2$, $X^1$, m, and n are as defined above (this polymer is referred to below as "the zwitterionic polymer A"). The zwitterionic compound may form a salt.

When $X^1$ is —N($Q^1$)-, examples of $C_{1-6}$ alkyl groups represented by $Q^1$ include methyl, ethyl, propyl (n-propyl or i-propyl), and butyl (n-butyl, i-butyl, s-butyl, and t-butyl). $Q^1$ is preferably a hydrogen atom or a $C_{1-4}$ alkyl group, and more preferably a hydrogen atom or a $C_{1-3}$ alkyl group.

$X^1$ is preferably —O— or —N(H)—. When $X^1$ is —N(H)—, bond cleavage is less likely to occur, compared to when it is —O—, and the polymer is stable under harsh conditions, such as high temperatures.

m and n can be appropriately selected according to, for example, the solubility in solvents. m is preferably an integer of 4 to 12 from the standpoint of improving solubility in organic solvents, and preferably an integer of 1 to 3 from the standpoint of improving water solubility.

n is preferably an integer of 1 to 3, and more preferably 1 or 2.

In the zwitterionic polymer A, the percentage of the unit represented by formula (1) is, for example, 10 mol % or more, preferably 20 mol % or more, more preferably 30 mol % or more, still more preferably 40 mol % or more, even more preferably 50 mol % or more, particularly preferably 60 mol % or more, and particularly more preferably 70 mol % or more, based on the total monomer units.

From the standpoint of further increasing the protein adsorption inhibitory effect, the percentage of the unit represented by formula (1) is preferably 80 mol % or more, more preferably 90 mol % or more, still more preferably more than 90 mol %, even more preferably 95 mol % or more, particularly preferably 99 mol % or more, and particularly more preferably 100 mol % (a homopolymer), based on the total monomer units.

The zwitterionic polymer A may be a copolymer and may further comprise an additional monomer unit in addition to the unit represented by formula (1). The additional monomer is usually a monomer containing an ethylenically unsaturated double bond. In this monomer, the number of ethylenically unsaturated double bonds is, for example, 1 to 3, preferably 1 or 2, and more preferably 1.

Examples of monomers containing an ethylenically unsaturated double bond include unsaturated carboxylic acids or salts, esters, or amides thereof; vinyl ethers; vinyl esters; and styrenesulfonic acid or salts thereof.

Examples of unsaturated carboxylic acids include (meth)acrylic acid, crotonic acid, maleic acid, maleic anhydride, fumaric acid, and itaconic acid.

Examples of salts of unsaturated carboxylic acids include alkali metal salts. Specific examples include sodium salts and potassium salts.

Examples of esters of unsaturated carboxylic acids include alkyl esters and hydroxyalkyl esters. Examples of alkyl esters include $C_{1-6}$ alkyl esters, such as methyl ester, ethyl ester, propyl ester, and butyl ester. Examples of hydroxyalkyl esters include hydroxy $C_{2-6}$ alkyl esters, such as a hydroxyethyl ester.

Examples of amides of unsaturated carboxylic acids include N-substituted and N,N-disubstituted amides. Examples of N-substituted amides include alkyl amides. Specific examples include $C_{1-6}$ alkyl amides, such as methyl amide and ethyl amide. Examples of N,N-disubstituted amides include dialkylamides. Specific examples include di-$C_{1-6}$ alkylamides, such as dimethylamide, diethylamide, and ethylmethylamide.

Examples of vinyl ethers include ethyl vinyl ether, ethylene glycol monovinyl ether, diethylene glycol monovinyl ether, propyl vinyl ether, and cyclohexyl vinyl ether.

Examples of vinyl esters include vinyl acetate, vinyl propionate, and vinyl butyrate.

The additional monomers may be used alone or in a combination of two or more.

The additional monomer is preferably (meth)acrylic acid, maleic acid, fumaric acid, itaconic acid, or a salt, ester, or amide thereof; and is, for example, at least one member selected from the group consisting of alkyl (meth)acrylates and alkyl (meth)acrylamides.

Examples of alkyl (meth)acrylates include $C_{1-10}$ alkyl (meth)acrylates, such as methyl (meth)acrylate, ethyl (meth)acrylate, propyl (meth)acrylate, butyl (meth)acrylate, pentyl (meth)acrylate, hexyl (meth)acrylate, heptyl (meth)acrylate, and octyl (meth)acrylate.

Alkyl (meth)acrylamides include N-alkyl (meth)acrylamides and N,N-dialkyl (meth)acrylamides. Examples of N-alkyl (meth)acrylamides include N—$C_{1-4}$ alkyl (meth)acrylamides, such as N-methyl (meth)acrylamide, N-ethyl (meth)acrylamide, and N-isopropyl (meth)acrylamide. Examples of N,N-dialkyl (meth)acrylamides include N,N-di-$C_{1-4}$ alkyl (meth)acrylamides, such as N,N-dimethyl (meth)acrylamide and N,N-diethyl (meth)acrylamide.

The additional monomer unit is preferably a unit represented by the following formula (2):

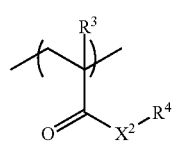

wherein $R^3$, $R^4$, and $X^2$ are as defined above.

In one embodiment, $R^3$ is preferably methyl, and $R^4$ is preferably a $C_{3-6}$ alkyl group, such as propyl, butyl, pentyl, or hexyl.

In another embodiment, $R^3$ is preferably —CO—$X^2$—$R^4$ or —$CH_2$—CO—$X^2$—$R^4$, and $R^4$ is preferably a $C_{1-6}$ alkyl group, such as methyl, ethyl, propyl, butyl, pentyl, or hexyl.

When $X^2$ is —N($Q^2$)-, examples of $C_{1-6}$ alkyl groups represented by $Q^2$ include methyl, ethyl, propyl, and butyl.

In one embodiment, the percentage of a methyl methacrylate unit in the copolymer is preferably 10 mol % or less or 5 mol % or less, based on the total monomer units, and the copolymer preferably does not contain the methyl methacrylate unit. In the copolymer in this embodiment, the percentage of an ethyl methacrylate unit is preferably 10 mol % or less or 5 mol % or less, based on the total monomer units, and the copolymer preferably does not contain the ethyl methacrylate unit.

The molar ratio of the unit represented by formula (1) and the additional monomer unit (e.g., a monomer unit containing an ethylenically unsaturated double bond, such as a unit represented by formula (2)) is preferably 10:90 to 40:60, more preferably 10:90 to 35:65, and still more preferably 10:90 to 30:70.

The zwitterionic polymer A may be, for example, a random copolymer, an alternating copolymer, a block copolymer, or a grafted copolymer, depending on the polymerization mode. The zwitterionic polymer A may be, for example, linear-shaped, comb-shaped, star-shaped, or ladder-shaped.

The zwitterionic polymer A has an excellent protein adsorption inhibitory effect over a wide pH range, for example, in the range of pH 1 to 10. The zwitterionic polymer A can achieve an excellent protein adsorption inhibitory effect even at the acidic range (e.g. pH 1 to 3), which is not suitable for polymers obtained by polymerization of MPC as a monomer.

Production Method for Zwitterionic Compound

The method for producing the zwitterionic polymer A is not particularly limited and may be, for example, a method comprising polymerizing a compound represented by the following formula (3):

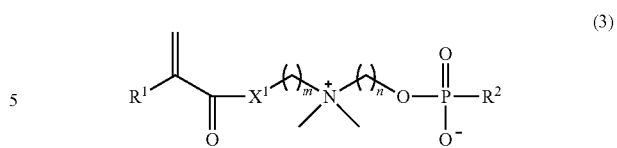

wherein $R^1$, $R^2$, $X^1$, m, and n are as defined above (a zwitterionic monomer).

In the following description, "a compound represented by formula (N)" (N is a positive integer) is referred to as "compound (N).*"

Production Method for Compound (3)

Compound (3) is obtained, for example, by the following reaction scheme:

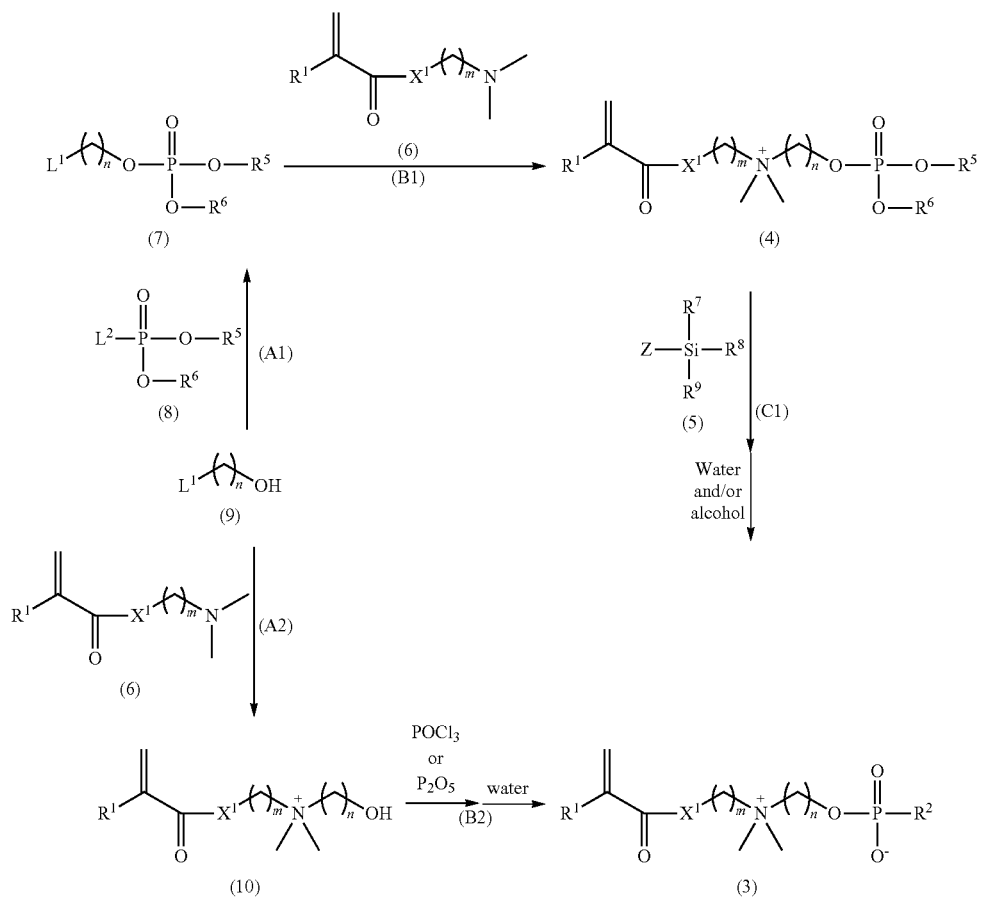

wherein $L^1$ and $L^2$ are the same or different, and are each independently a halogen atom, and $R^1$, $R^2$, $R^5$ to $R^9$, $X^1$, Z, m, and n are as defined above.

The reaction scheme above can produce compound (3) of high purity. The purity of compound (3) is, for example, 90% or higher, preferably 95% or higher, and more preferably 99% or higher. The purity is determined by $^1$H-NMR and $^{31}$P-NMR.

Step (A1)

Step (A1) is a step of reacting compound (9) with compound (8) to obtain compound (7).

In compounds (8) and (9), examples of halogen atoms represented by $L^1$ and $L^2$ include chlorine, bromine, and iodine.

The amount of compound (8) for use is usually 0.8 to 2.0 mol, and preferably 1.0 to 1.2 mol, per mole of compound (9).

The reaction in step (A1) is preferably performed in the presence of a base. Examples of bases include chain amines (e.g., di or tri-$C_{1-4}$ alkylamines, such as triethylamine and N,N-diisopropylethylamine), and cyclic amines (e.g., 1,4-diazabicyclo[2.2.2]octane, pyridine, N,N-dimethyl-4-aminopyridine, and 2,6-lutidine, 2,6-di-tert-butylpyridine). These bases may be used alone or in a combination of two or more.

The amount of base for use is usually 1.1 to 2.0 mol, and preferably 1.2 to 1.5 mol, per mole of compound (9).

The reaction in step (A1) is preferably performed in a solvent. Examples of solvents include polar aprotic solvents. Specific examples include haloalkanes, such as dichloromethane and dichloroethane; and diethyl ether, tetrahydrofuran, acetonitrile, dimethyl sulfoxide, dimethyl formamide, and hexamethylphosphoric triamide. These solvents may be used alone or in a combination of two or more.

The reaction temperature and reaction time in step (A1) are not particularly limited as long as the reaction proceeds. The reaction temperature is, for example, 0 to 100° C., and preferably 5 to 40° C. The reaction time is, for example, 1 to 24 hours, and preferably 2 to 12 hours.

Step (B1)

Step (B1) is a step of reacting compound (7) with compound (6) to obtain compound (4).

The amount of compound (6) for use is, for example, 0.5 to 2.0 mol, preferably 0.9 to 1.1 mol, and usually about 1 mol, per mole of compound (7).

The reaction in step (B1) is preferably performed in a solvent. Examples of solvents include aprotic solvents. Specific examples include nitriles, such as acetonitrile; ethers, such as diethyl ether and tetrahydrofuran; and ethyl acetate, dimethyl sulfoxide, dimethyl formamide, hexamethylphosphoric triamide, hexane, benzene, toluene, and xylene. These solvents may be used alone or in a combination of two or more.

The reaction temperature and reaction time in step (B1) are not limited as long as the reaction proceeds. The reaction temperature is, for example, 0 to 100° C., and preferably 5 to 40° C. The reaction time is, for example, 1 to 100 hours, and preferably 2 to 80 hours.

Step (C1)

Step (C1) is a step of reacting compound (4) with compound (5), followed by reaction with water and/or an alcohol, to obtain compound (3).

In compound (5), examples of alkyl groups represented by $R^7$ to $R^9$ include $C_{1-4}$ alkyl groups, such as methyl, ethyl, propyl, and butyl.

Examples of halogen atoms represented by Z include chlorine, bromine, and iodine.

The amount of compound (5) for use is usually 2 to 40 mol, preferably 12 to 20 mol, per mole of compound (4).

The reaction with compound (5) is preferably performed in a solvent. Examples of solvents include aprotic solvents. Specific examples include acetonitrile, hexane, benzene, toluene, and xylene. These solvents may be used alone or in a combination of two or more.

The reaction temperature and reaction time in the reaction with compound (5) are not particularly limited as long as the reaction proceeds. The reaction temperature is, for example, −10 to 40° C., and preferably −5 to 30° C. In terms of purity, the reaction time is preferably 5 hours or more, more preferably 6 hours or more, still more preferably 7 hours or more, even more preferably 8 hours or more, and particularly preferably 9 hours or more, and is usually 20 hours or less, and preferably 15 hours or less.

Examples of alcohols include $C_{1-4}$ alcohols, such as methanol and ethanol. These alcohols may be used alone or in a combination of two or more.

In the reaction with water and/or an alcohol, the reaction temperature and reaction time are not particularly limited as long as the reaction proceeds. The reaction temperature is, for example, 0 to 100° C., and preferably 5 to 40° C. The reaction time is, for example, 1 to 24 hours, and preferably 2 to 12 hours.

Step (A2)

Step (A2) is a step of reacting compound (9) with compound (6) to obtain compound (10).

The amount of compound (6) for use is, for example, 0.5 to 2.0 mol, preferably 0.9 to 1.1 mol, and usually about 1 mol, per mole of compound (9).

Like step (B1), the reaction in step (A2) is preferably performed in a solvent.

The reaction temperature and reaction time in step (A2) are not particularly limited as long as the reaction proceeds. The reaction temperature is, for example, 10 to 150° C., and preferably 20 to 120° C. The reaction time is, for example, 1 to 48 hours, and preferably 2 to 36 hours.

Step (B2)

In one embodiment, step (B2) is a step of reacting compound (10) with $POCl_3$, followed by hydrolyzation, to obtain compound (3).

The amount of $POCl_3$ for use is usually 1 to 100 mol, and preferably 8 to 10 mol, per mole of compound (10).

The reaction with $POCl_3$ may be performed in the presence of a base. Examples of bases include chain amines (e.g., tri-$C_{1-4}$ alkylamines, such as triethylamine) and cyclic amines (e.g., pyridine and imidazole). These bases may be used alone or in a combination of two or more.

The amount of base for use is usually 1.2 to 120 mol, and preferably 9 to 12 mol, per mole of compound (10).

The reaction with $POCl_3$ is preferably performed in a solvent. Examples of solvents include aprotic solvents. Specific examples include acetonitrile, diethyl ether, tetrahydrofuran, ethyl acetate, dimethyl sulfoxide, dimethyl formamide, hexamethylphosphoric triamide, hexane, benzene, toluene, and xylene. These solvents may be used alone or in a combination of two or more.

In the reaction with $POCl_3$, the reaction temperature is, for example, −40 to 5° C., and preferably −30 to 0° C. The reaction time is, for example, 0.5 to 24 hours, and preferably 1 to 12 hours.

In another embodiment, step (B2) is a step of reacting compound (10) with $P_2O_5$, followed by hydrolyzation, to obtain compound (3).

The amount of $P_2O_5$ for use is usually 0.5 to 10 mol, and preferably 1 to 5 mol, per mole of compound (10).

The reaction with $P_2O_5$ is preferably performed in a solvent. Examples of solvents include aprotic solvents. Specific examples include acetonitrile, diethyl ether, tetrahydrofuran, ethyl acetate, dimethyl sulfoxide, dimethyl formamide, hexamethylphosphoric triamide, hexane, benzene, toluene, and xylene. These solvents may be used alone or in a combination of two or more.

In the reaction with $P_2O_5$, the reaction temperature is, for example, 10 to 150° C., and preferably 30 to 100° C. The reaction time is, for example, 1 to 12 hours, and preferably 2 to 10 hours.

Compound (3) and its intermediates may be purified by common methods (e.g., filtration, chromatography, reprecipitation, concentration, two or three or more repetitions of each of these operations, or combinations of each of these operations).

Step of Polymerizing Compound (3)

The zwitterionic polymer A can be produced by polymerizing compound (3) obtained in step (C1), step (B2), or the like.

Compound (3) may be polymerized alone or copolymerized with an additional monomer. The additional monomer for use may be, for example, the same as those listed as additional monomers in the "Zwitterionic Compound" section.

The molar ratio of compound (3) and the additional monomer is preferably 1:99 to 99:1, more preferably 5:95 to 95:5, still more preferably 10:90 to 90:10, even more preferably 15:85 to 85:15, and particularly preferably 20:80 to 80:20.

Polymerization of compound (3) may be performed in the presence of a catalyst, a crosslinking agent, a polymerization initiator, and the like. Examples of polymerization initiators include thermal polymerization initiators and photopolymerization initiators.

Examples of thermal polymerization initiators include peroxides and azo compounds.

Examples of peroxides include dialkyl peroxides (e.g., di-t-butyl peroxide and dicumyl peroxide), diacyl peroxides (e.g., lauroyl peroxide and benzoyl peroxide), and peroxy acids or peracid esters (e.g., t-butyl hydroperoxide and cumene hydroperoxide).

Examples of azo compounds include azobisisobutyronitrile (AIBN), 2,2'-azobis(2-methylbutyronitrile), and 2,2'-azobis(2,4-dimethylvaleronitrile).

The thermal polymerization initiators may be used alone or in a combination of two or more.

Examples of photopolymerization initiators include benzoins (e.g., benzoin, benzoin methyl ether, benzoin ethyl ether, benzoin isopropyl ether), acetophenone, benzophenone, benzoyl benzoate, 1,4-dibenzoyl benzene, dibenzoyl, and combinations thereof.

The photopolymerization initiators may be used in combination with photosensitizers. Examples of photosensitizers include trialkylamines, trialkanolamines (e.g., triethanolamine), dialkylaminobenzoic acid alkyl esters (e.g., ethyl dimethylaminobenzoate and amyl dimethylaminobenzoate), dialkylaminobenzophenones (e.g., 4-(dimethylamino)benzophenone and 4,4-bis(diethylamino)benzophenone), and combinations thereof.

The polymerization of compound (3) may be performed in the presence of a solvent. Examples of solvents include protic solvents (e.g., water, methanol, ethanol, propanol, and butanol), and aprotic solvents (e.g., ethyl acetate, dimethyl sulfoxide, dimethyl formamide, hexamethylphosphoric triamide, hexane, benzene, toluene, and xylene). These solvents may be used alone or in a combination of two or more.

The polymerization of compound (3) is not particularly limited as long as polymerization proceeds.

For thermal polymerization, the polymerization temperature is, for example, 30 to 150° C., and preferably 50 to 100° C. The polymerization time is, for example, 5 to 20 hours, and preferably 10 to 15 hours.

For photopolymerization, active energy rays (e.g., ultraviolet rays) are usually irradiated. The irradiation amount is not particularly limited, and is, for example, 50 to 10000 mJ/cm$^2$.

The polymerized product obtained by polymerization of compound (3) may be purified by common methods (e.g., dialysis).

The polymerized product may be in a solid or gel form. The polymerized product in a solid form may be, for example, in a one-dimensional form (e.g., a chain-like form), a two-dimensional form (e.g., a film-like or sheet-like form), or a three-dimensional form (e.g., a tubular-like form).

A polymerized product in a film-like or sheet-like form is obtained, for example, by a method comprising the steps of applying a polymerizable composition containing compound (3) and a solvent to a base material, and polymerizing the polymerizable composition applied to the base material.

Examples of the materials of base materials include glass, metals (e.g., chromium, cobalt, nickel, titanium, and alloys containing these), ceramics (e.g., hydroxyapatite), and resins (e.g., fluorine resins, polyolefin resins, (meth)acrylic resins, polystyrene resins, polyester resins, polycarbonate resins, cellulose resins, and polyamide resins). The base material may be a mold-release base material.

Examples of the method for application to a base material include a coating method (e.g., spin coating, bar coating, and gravure coating), a dipping method, and a spraying method.

Molded Body

In one embodiment, a molded body contains the zwitterionic polymer A. The molded body is preferably a film or sheet.

The molded body may further contain an additive. Examples of additives include stabilizers (e.g., heat stabilizers, antioxidants, and UV absorbers), fillers, antistatic agents, flame retardants, surfactants, plasticizers, and antifouling agents. These additives may be used alone or in a combination of two or more.

The thickness of the molded body depends on the shape. For films, the thickness is, for example, 0.5 to 500 μm, and preferably 1 to 200 μm. For sheets, the thickness is, for example, 0.5 to 5 mm, and preferably 1 to 3 mm.

The molded body can be obtained by molding the zwitterionic polymer A according to a known molding method, such as extrusion molding, injection molding, blow molding, cast molding, calendar molding, and inflation molding. For example, a molded body in the form of a film or sheet can be produced by using a film-formation method based on melting (e.g., T-die, calendaring, or inflation) or a film-formation method based on a solution (e.g., casting).

Polymer Brush

In one embodiment, a polymer brush contains a base material and a polymer layer formed of multiple polymer chains each of whose one end is fixed to the base material and the other end is a free end, wherein the multiple polymer chains contain the zwitterionic polymer A.

The base material for use may be, for example, the same as those listed as base materials in the "Step of Polymerizing Compound (3)" in the "Production Method for Zwitterionic Compound" section. The base material may be those that have been subjected to a surface treatment (e.g., cleaning, etching).

The polymer brush can be produced, for example, by a method comprising the steps of (a) fixing a functional group that serves as the starting point of a polymerization reaction on the surface of a base material, and (b) polymerizing a monomer from the starting point.

Step (a) is preferably performed by using a method in which an initiator containing a functional group that serves as the starting point of polymerization reaction (referred to below as an "initiator for brushes") is fixed to the surface of a base material. This method is preferably a method in which a composition containing the initiator for brushes and a solvent is applied to a base material. The method for application to a base material may be, for example, the same as those listed as the method for application to a base material in the description above in terms of the method for producing a polymerized product in a film-like form in the "Production Method for Zwitterionic Compound" section.

The initiator for brushes for use is preferably a compound containing a bonding group capable of bonding to a base material and a polymerization initiating group that serves as a polymerization starting point.

Examples of the bonding group include reactive silyl groups, such as trimethoxysilyl and triethoxysilyl; thiol groups; disulfide groups; and phosphate groups. Of these, reactive silyl groups are preferred.

Examples of the polymerization initiating group include alkyl halide groups, such as 1-bromoethyl, 1-methyl-1-bromoethyl, and chloroethyl; nitroxy group-containing functional groups, such as 2,2,6,6-tetramethylpiperidinyl-1-oxy, N-(t-butyl)-1-phenyl-2-methylpropylnitroxy, and N-(t-butyl)-1-diethylphosphono-2,2-dimethylpropylnitroxy; and $SO_2Cl$. Of these, alkyl halide groups are preferred.

Examples of initiators for brushes include trialkoxysilyl alkyl haloalkanoate. Specific examples include a compound represented by the following formula:

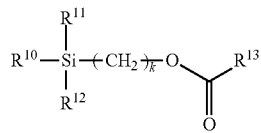

wherein $R^{10}$ to $R^{12}$ are each independently an alkoxy group, $R^{13}$ is a haloalkyl group, and k is an integer of 2 or more.

Examples of alkoxy groups represented by $R^{10}$ to $R^{12}$ include $C_{1-6}$ alkoxy groups, such as methoxy, ethoxy, propoxy, and butoxy. Of these, $C_{1-4}$ alkoxy groups are preferred, and methoxy or ethoxy is more preferred.

Examples of haloalkyl groups represented by $R^{13}$ include halo $C_{1-6}$ alkyl groups, such as 1-bromoethyl and 1-methyl-1-bromoethyl. $R^{13}$ is preferably a halo $C_{1-4}$ alkyl group.

The initiators for brushes may be used alone or in a combination of two or more.

Examples of solvents include protic solvents (e.g., water, methanol, ethanol, propanol, and butanol), and aprotic solvents (e.g., ethyl acetate, acetone, dimethyl sulfoxide, dimethyl formamide, hexamethylphosphoric triamide, hexane, benzene, toluene, and xylene). These solvents may be used alone or in a combination of two or more.

When a composition containing a surface initiator and a solvent is applied to a base material, the surface of the base material reacts with the surface initiator to form a bond. The reaction temperature and reaction time are not particularly limited as long as the surface initiator is fixed to a base material. The reaction temperature is, for example, 10 to 40° C., and preferably 15 to 30° C.; and the reaction time is, for example, 1 to 36 hours, and preferably 5 to 30 hours.

In step (b), the monomer for use is not particularly limited as long as it contains compound (3), and may be compound (3) alone or a combination of compound (3) and an additional monomer. The additional monomer for use may be, for example, the same as those listed as additional monomers in the "Zwitterionic Compound" section.

The polymerization method in step (b) is preferably a radical polymerization method, and more preferably a living radical polymerization method. Examples of living radical polymerization methods include atom transfer radical polymerization (ATRP), reversible addition-fragmentation chain transfer polymerization (RAFT), and nitroxide-mediated polymerization (NMP). Of these, ATRP and NMP are preferred, and in terms of reaction stability, ATRP is preferred.

The polymerization is preferably performed in the presence of a catalyst. The catalyst is usually a metal catalyst. Specific examples include metal halide catalysts and metal complex catalysts.

Examples of metal halide catalysts include copper halide catalysts, such as copper(I) chloride, copper(II) chloride, copper(I) bromide, and copper(II) bromide; titanium halide catalysts, such as titanium(II) chloride, titanium(III) chloride, titanium(IV) chloride, and titanium(IV) bromide; iron halide catalysts, such as iron(II) chloride, iron(III) chloride, iron(II) bromide, and iron(III) bromide; cobalt halide catalysts, such as cobalt(II) chloride and cobalt(II) bromide; nickel halide catalysts, such as nickel(II) chloride and nickel (II) bromide; molybdenum halide catalysts, such as molybdenum(III) chloride and molybdenum(V) chloride; and ruthenium halide catalysts, such as ruthenium(III) chloride.

Examples of metal complex catalysts include ruthenium complex catalysts, iron complex catalysts, nickel complex catalysts, palladium complex catalysts, rhodium complex catalysts, copper complex catalysts, rhenium complex catalysts, and molybdenum complex catalysts.

The catalysts may be used alone or in a combination of two or more. The catalyst is preferably a metal halide catalyst, and more preferably a copper halide catalyst.

The catalysts may be combined with ligands. The ligands are preferably electron-donating ligands. Examples include polydentate amines, such as tris[2-(dimethylamino)ethyl] amine, 1,4,8,11-tetraazacyclotetradecane, 1,4,8,11-tetramethyl-1,4,8,11-tetraazacyclotetradecane, 1,1,4,7,10,10-hexamethyltriethylenetetramine, and N,N,N',N'',N''-pentamethyldiethylenetriamine; pyridine compounds, such as tris[2-pyridylmethyl]amine, N-butyl-2-pyridylmethaneimine, N-dodecyl-N-(2-pyridylmethylene)amine, N-octadecyl-N-(2-pyridylmethylene)amine, N-octyl-2-pyridylmethaneimine, 4,4'-dinonyl-2,2'-dipyridyl, 4,4'-di-(t-butyl)-2,2'-dipyridyl, 4,4'-dimethyl-2,2'-dipyridyl, N,N,N',N'-tetrakis(2-pyridylmethyl)ethylenediamine, and 2,2'-bipyridyl; phosphine compounds; and cyclopentadiene compounds.

The polymerization may be performed in the presence of a solvent. Examples of solvents include protic solvents (e.g., water, methanol, ethanol, propanol, and butanol), and aprotic solvents (e.g., ethyl acetate, dimethyl sulfoxide, dimethyl formamide, hexamethylphosphoric triamide, hexane, benzene, toluene, and xylene). These solvents may be used alone or in a combination of two or more.

The polymerization is preferably performed in the presence of an initiator. Examples of initiators include bromine-based initiators (e.g., ethyl bromoacetate, methyl bromoacetate, (1-bromoethyl)benzene, and ethyl 2-bromoisobutyrate)), and chlorine-based initiators (e.g., methyl chloroacetate, methyl 2-chloropropionate, and 2,2-dichloroacetophenone). These initiators may be used alone or in a combination of two or more.

Biocompatible Material

The zwitterionic polymer A has excellent biocompatibility and can be applied to the surface of a material to impart biocompatibility to the material or enhance biocompatibility of the material, allowing the material to be usable as a biocompatible material. In one embodiment, a biocompatible material contains the zwitterionic polymer A. "Biocompatible material" refers to a material with the properties of not being easily adhered by proteins, cells, etc.

Examples of biocompatible materials include surface-covering materials (or surface-coating materials) of medical materials, such as artificial blood vessels, catheters, artificial organs, artificial joints, artificial dialysis membranes, artificial skin, artificial bones (joints etc.), contact lenses, adhesive plasters, and bandages; liquids for preserving contact lenses; surface-modifying materials for diagnostic medical devices, such as biochips and microarray chips; cell culture sheets; materials for preserving blood, proteins, or cells; materials for protein anticoagulation; moisturizers; and materials for facial masks (cosmetics).

EXAMPLES

The present invention is described in more detail below with reference to Examples. However, the present invention is not limited to these Examples.

Synthetic Examples: Zwitterionic Monomer

Synthetic Example 1: Synthesis of (2-(methacryloyloxy)ethyl dimethylammonio)ethyl phosphate (MCHP)

Step A1: Synthesis of diethyl 2-bromoethylphosphate

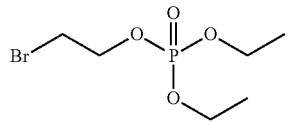

N,N-dimethyl-4-aminopyridine (0.18 g, 1.5 mmol) was placed in a side-arm flask under nitrogen atmosphere. To the flask were added dry dichloromethane (27 mL), dry triethylamine (3.0 mL, 22 mmol), and 2-bromoethanol (1.0 mL, 15 mmol). Diethyl chlorophosphate (2.9 mL, 20 mmol) was added dropwise to the solution, and the mixture was stirred for 1 h at 0° C. The resulting reaction mixture was warmed to room temperature and stirred overnight. Thereafter, the triethylamine hydrochloride formed was filtered off. The filtrate was transferred to a separatory funnel and washed with a saturated solution of sodium bicarbonate. The resulting organic layers were washed with water, brine, and then 2N HCl. The resulting organic layers were further washed with water and brine, dried over anhydrous magnesium sulfate, filtered, and concentrated to give the title compound as a colorless liquid (3.16 g, 81%).

$^1$H NMR (400 MHz, CDCl$_3$): δ=1.35-1.37 (t, J=6.87, 7.16, 6H, CH$_3$—CH$_2$), 3.53-3.56 (t, J=6.30, 2H, CH$_2$—Br), 4.12-4.18 (quin, J=6.87, 7.16, 4H, PO—CH$_2$—CH$_3$), 4.29-4.33 (dt, J=6.30, 2H, Br—CH$_2$—CH$_2$—OP)

Step B1: Synthesis of (2-(methacryloyloxy)ethyl dimethylammonio)ethyl diethyl phosphate

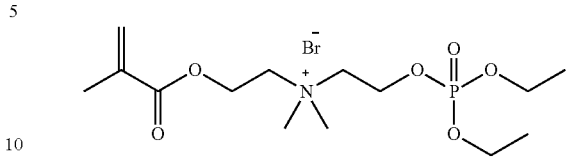

The diethyl 2-bromoethylphosphate (1.04 g, 4 mmol) obtained in step A1, 2-(dimethylamino)ethyl methacrylate (0.76 mL, 4.5 mmol), and acetonitrile (7 mL) were stirred at room temperature for 3 days. The solution was concentrated to give a crude product as a colorless liquid. The crude product was reprecipitated from ethyl acetate and washed with ethyl acetate to give the title compound as a viscous colorless liquid (1.43 g, 64%).

$^1$H NMR (400 MHz, DMSO-d6): δ=1.24-1.28 (dt, J=0.91, 7.02, 6H, CH$_3$CH$_2$—OP), 1.90 (s, 3H, CH$_3$—), 3.19 (s, 6H, —N$^+$(CH$_3$)$_2$—), 3.79-3.83 (m, 4H, CH$_2$—N$^+$(CH$_3$)$_2$—CH$_2$—CH$_2$—OP), 3.83 (dq, 4H, CH$_3$CH$_2$—OP), 4.43-4.67 (q, J=3.4, 6.12, 2H, —N—CH$_2$—CH$_2$—OP), 4.53 (br, 2H, C(O)—O—CH$_2$—), 5.717, 6.162 (t, 2H, C=CH$_2$)

Step C1: Synthesis of MCHP

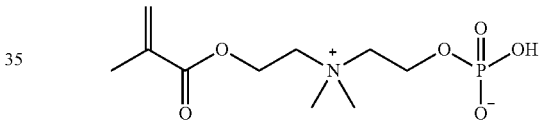

The (2-(methacryloyloxy)ethyl dimethylammonio)ethyl diethyl phosphate (0.61 g, 1.5 mmol) obtained in step B1 was placed in a side-arm flask under nitrogen atmosphere. To the flask was added dry acetonitrile (15 mL). Bromotrimethylsilane (1.2 mL, 9.0 mmol) was added dropwise to the solution, and the mixture was stirred for 9 h at 0° C. The solution was concentrated to give a crude product as a viscous liquid (yield: 61%). Methanol was added to the crude product, and the mixture was stirred for 9 h. The mixture was washed twice with a mixed solvent of water and acetone (water:acetone=9:1), and purified with a strongly acidic cation exchange resin (H type, DOWEX 50Wx8, 50 to 100 mesh) to give a colorless liquid. The liquid was then concentrated to remove acetone, and the resulting solution was lyophilized overnight. Finally, reprecipitation operation in which the lyophilized product was dissolved in a small amount of dry methanol, and the mixture was added dropwise to dry acetone under nitrogen atmosphere to obtain a white powder precipitate was repeated three times to give the title compound (0.103 g, 27%).

$^1$H NMR (400 MHz, DMSO-d6): δ=1.90 (s, 3H, CH$_3$—), 3.19 (s, 6H, —N$^+$(CH$_3$)$_2$—), 3.75 (m, 2H, —N$^+$(CH$_3$)$_2$—CH$_2$—CH$_2$—OP), 3.83 (br, 2H, —O—CH$_2$—CH$_2$—N), 4.27 (br, 2H, —CH$_2$—OP), 4.53 (br, 2H, —O—CH$_2$—), 5.717, 6.162 (t, 2H, C=CH$_2$) (purity: 99.89%)

Synthetic Example 2: Synthesis of MCHP

Step A2: Synthesis of 2-cholinium bromide methacrylate

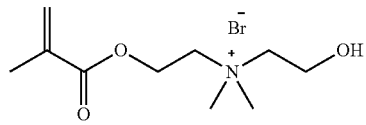

The inside of a side-arm flask was replaced by nitrogen, and 2-(dimethylamino)ethyl methacrylate (0.5 mL, 3.0 mmol), 2-bromoethanol (0.2 mL, 3 mmol), and acetonitrile (6 mL) were placed in the flask. The mixture was stirred for 24 h at room temperature. The solution was concentrated to give a crude product as a viscous colorless liquid. The crude product was dissolved in chloroform and reprecipitated from ethyl acetate. Then, filtration and washing with ethyl acetate were carried out to give a white solid (0.81 g, 96%).

$^1$H NMR (400 MHz, CD$_3$OD): δ=1.97 (s, 3H, C$\underline{H}_3$—), 3.276 (s, 6H, —N$^+$(C$\underline{H}_3$)$_2$—), 3.613 (m, 2H, —N$^+$(CH$_3$)$_2$—C$\underline{H}_2$—CH$_2$—OH), 3.88 (m, 2H, —O—CH$_2$—C$\underline{H}_2$—), 4.028 (m, 2H, —C$\underline{H}_2$—OH), 4.641 (m, 2H, —O—C$\underline{H}_2$—), 5.717, 6.162 (2s, 2H, C=C$\underline{H}_2$)

Step B2: Synthesis of MCHP

The inside of a three-necked flask was replaced by nitrogen, and the 2-cholinium bromide methacrylate (0.34 g, 1.2 mmol) obtained in step A2, imidazole (0.90 g, 12 mmol), and dry acetonitrile (8 mL) were placed in the flask. Phosphoryl chloride (0.4 mL, 4.3 mmol) and dry acetonitrile (20 mL) were added dropwise to the solution at −25° C. After 20 minutes, water was added, and the mixture was kept until the next day. The imidazole hydrochloride formed was filtered off, and the filtrate was concentrated under vacuum to give a crude product as a white solid (0.624 g). The crude product was passed through a DIAION SK104H, and this procedure was repeated three times to give a yellow oil (0.4976 g, 52%). Further, reversed-phase silica column chromatography (0.1 mass % TFA aqueous solution:acetonitrile=95:5) was carried out for separation to give the title compound as a viscous colorless liquid (47.4 mg, 13%).

$^1$H NMR (400 MHz, DMSO-d6): δ=1.90 (s, 3H, C$\underline{H}_3$—), 3.19 (s, 6H, —N$^+$(C$\underline{H}_3$)$_2$—), 3.75 (m, 2H, —N$^+$(CH$_3$)$_2$—C$\underline{H}_2$—CH$_2$—OP), 3.83 (br, 2H, —O—CH$_2$—C$\underline{H}_2$—N), 4.27 (br, 2H, —C$\underline{H}_2$—OP), 4.53 (br, 2H, —O—C$\underline{H}_2$—), 5.717, 6.162 (2s, 2H, C=C$\underline{H}_2$)

Synthetic Example 3: Synthesis of MCHP

The inside of a three-necked flask was replaced by nitrogen, and the 2-cholinium bromide methacrylate obtained in step A2 (0.282 g, 1.0 mmol) and dry acetonitrile (2.5 mL) were placed in the flask. After the flask was placed in an ice bath, phosphoryl chloride (0.28 mL, 3.0 mmol) was added dropwise thereto. After 12 hours, deionized water (0.28 mL, 16.0 mmol) was added, and the mixture was stirred for 12 h. The solution was concentrated and then dried under reduced pressure to give a crude product as a yellow liquid ($^1$H NMR yield: 61%). The crude product (0.845 g) was subjected to reversed-phase silica column chromatography (0.1 mass % TFA aqueous solution:acetonitrile=95:5) for separation to give the title compound (0.139 g, 49%).

Synthetic Example 4: Synthesis of MCHP

Step A4: Synthesis of 2-cholinium chloride methacrylate

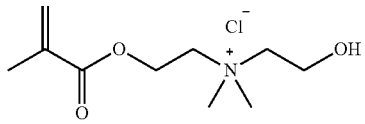

The 2-cholinium bromide methacrylate obtained in step A2 was dissolved in water, adsorbed on a strongly acidic cation exchange resin (H-type, DOWEX 50Wx8, 50 to 100 mesh), and eluted with 0.1M hydrochloric acid. The resulting product was lyophilized to give the title compound.

Step B4: Synthesis of MCHP (1) P$_2$O$_5$ (2.896 g, 15 mmol) was placed in a side-arm flask under nitrogen atmosphere, and the 2-cholinium chloride methacrylate (2.183 g, 10 mmol) obtained in step A4 and dry acetonitrile (15 mL) were placed in a dropping funnel. Dry acetonitrile (50 mL) was added to the flask.

(2) The white solid solution was added dropwise (6 to 7 drops per minute) to the flask while the temperature was adjusted to 25° C. in an oil bath. After completion of the dropwise addition, the reaction was carried out for 5 h at 70° C., and the mixture was filtered and separated into liquid and solid.

(3) Milli-Q water (1 mL) was added dropwise to the liquid phase obtained above, stirred for 3 h at 70° C., and lyophilized to give a crude product.

(4) A reprecipitation operation in which the crude product was dissolved in methanol, and the resulting product was added dropwise to dry acetone under nitrogen atmosphere to obtain a precipitate was repeated three times to give a white powder.

(5) The obtained white powder was dissolved in a small amount of acetonitrile, and the insoluble portion was removed by filtration. The resulting product was then added dropwise to dry acetone under nitrogen atmosphere to give the title compound.

(5') As an alternative method to (5), the obtained white powder1 was dissolved in ion exchange water, adsorbed on a strongly acidic cation exchange resin (H-type, DOWEX 50Wx8, 50 to 100 mesh), and eluted with an acetic acid solution to give the title compound.

$^1$H NMR (400 MHz, DMSO-d6): δ=1.899 (s, 3H, C$\underline{H}_3$—), 3.148 (s, 6H, —N$^+$(C$\underline{H}_3$)$_2$—), 3.484 (m, 2H, —N$^+$(CH$_3$)$_2$—C$\underline{H}_2$—CH$_2$—OP), 3.760 (m, 2H, —O—CH$_2$—C$\underline{H}_2$—N), 4.262 (m, 2H, —C$\underline{H}_2$—OP), 4.515 (m, 2H, —O—C$\underline{H}_2$—), 5.758, 6.081 (s, 2H, C=C$\underline{H}_2$) (purity: 99.97%)

$^{31}$P NMR (400 MHz, DMSO-d6): δ=−0.656 (purity: 99.93%)

Synthetic Example 5: Synthesis of 2-{(3-methacrylamidopropyl)dimethylammonio}ethyl phosphate (MACHP)

Step A5: Synthesis of N-[3-(dimethylamino)propyl]methacrylamide

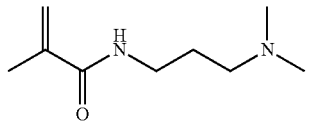

Dry dichloromethane was placed in a side-arm flask under nitrogen atmosphere. Triethylamine (42 mL, 415 mmol) and N,N-dimethyl-1,3-propanediamine (12 g, 143 mmol) were added to the flask. Methacryloyl chloride (9.7 ml, 87 mmol) was added dropwise to the solution, and the mixture was stirred at 0° C. overnight. The solution was filtered to remove triethylamine hydrochloride, and the filtrate was concentrated to give a crude product as a viscous liquid. This crude product was purified by vacuum distillation (5 mmHg, 140° C.) to give a viscous colorless liquid. This viscous liquid was then subjected to silica chromatography (chloroform:methanol=100:2→100:25) to give the title compound as a colorless viscous liquid (8.05 g, 47 mmol, 51%).

$^1$H NMR (400 MHz, CDCl$_3$): δ=1.53-1.59 (m, 2H, —NH—CH$_2$—C$\underline{H}_2$—CH$_2$—N(CH$_3$)$_2$), 1.80 (s, 3H, C$\underline{H}_3$—CH$_2$), 2.11 (s, 6H, N(C$\underline{H}_3$)$_2$), 2.27-2.30 (m, 2H, —NH—CH$_2$—CH$_2$—C$\underline{H}_2$—N(CH$_3$)$_2$), 3.23-3.29 (m, 2H, —NH—C$\underline{H}_2$—CH$_2$—CH$_2$—N(CH$_3$)$_2$), 5.16, 5.61 (2s, 2H, C=CH$_2$), 7.82 (s, 1H, N$\underline{H}$)

Step B5: Synthesis of 2-{(3-methacrylamidopropyl)dimethylammonio}ethyl diethyl phosphate

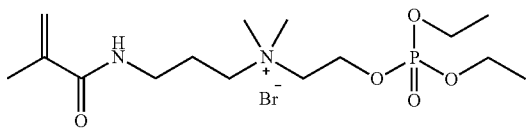 [SMILES: C=C(C)C(=O)NCCC[N+](C)(C)CCOP(=O)(OCC)OCC ; [Br-]]

The N-[3-(dimethylamino) propyl]-2-methyl-2-propenamide (3.48 g, 20 mmol) obtained in step A5, the diethyl 2-bromoethylphosphate (6.69 g, 26 mmol) obtained in step A1, acetonitrile (5 ml), and a small amount of 4-methoxyphenol, i.e., a polymerization inhibitor, were placed in a round-bottom flask. After stirring at room temperature for 24 h, the solution was concentrated to give a crude product as a viscous liquid. This crude product was decanted with 20 times the volume of ethyl acetate to give the title compound as a viscous liquid (2.71 g, 6.2 mmol, 31%).

$^1$H NMR (400 MHz, DMSO-d6): δ=1.20-1.23 (t, 6H, C$\underline{H}_3$—CH$_2$—OP), 1.82 (s, 3H, C$\underline{H}_3$—CH$_2$), 1.84-1.88 (br, 2H, —NH—CH$_2$—C$\underline{H}_2$—CH$_2$—N(CH$_3$)$_2$), 3.08 (s, 6H, —N$^+$(C$\underline{H}_3$)$_2$—), 3.12-3.16 (m, 2H, —NH—CH$_2$—CH$_2$—C$\underline{H}_2$—N(CH$_3$)$_2$), 3.35-3.41 (m, 2H, —NH—C$\underline{H}_2$—CH$_2$—CH$_2$—N(CH$_3$)$_2$), 3.66-3.68 (m, 2H, —N$^+$(CH$_3$)$_2$—CH$_2$—C$\underline{H}_2$—OP), 4.01-4.06 (m, 4H, PO—C$\underline{H}_2$—CH$_3$), 4.35-39 (br, 2H, CH$_2$—C$\underline{H}_2$—OP), 5.28, 5.67 (2s, 2H, C=CH$_2$), 8.02 (s, 1H, N$\underline{H}$)

Step C5: Synthesis of MACHP

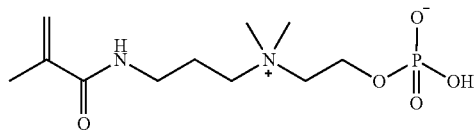 [SMILES: C=C(C)C(=O)NCCC[N+](C)(C)CCOP(=O)([O-])O]

The 2-{(3-methacrylamidopropyl)dimethylammonio}ethyl diethyl phosphate (2.71 g, 6.2 mmol) obtained in step B5 was placed in a side-arm flask under nitrogen atmosphere. Dry acetonitrile (70 mL) was added to the flask. Bromotrimethylsilane (10 mL, 65 mmol) was added dropwise to the solution, and the mixture was stirred at 0° C. for 9 h. The solution was concentrated to give a crude product as a viscous liquid. The crude product was dissolved in a small amount of dry methanol, and the resulting product was added dropwise to dry acetone under nitrogen atmosphere to give the title compound (2.11 g).

$^1$H NMR (400 MHz, DMSO-d6): δ=1.85 (s, 3H, C$\underline{H}_3$—), 1.86-1.90 (m, 2H, —NH—CH$_2$—C$\underline{H}_2$—CH$_2$—N(C$\underline{H}_3$)$_2$), 3.09 (s, 6H, —N$^+$(C$\underline{H}_3$)$_2$—), 3.24-3.39 (m, 2H, —NH—C$\underline{H}_2$—CH$_2$—CH$_2$—N(CH$_3$)$_2$), 3.60-3.63 (m, 2H, —NH—C$\underline{H}_2$—CH$_2$—C$\underline{H}_2$—N(CH$_3$)$_2$), 3.73-3.86 (br, 2H, —O—CH$_2$—C$\underline{H}_2$—N), 4.23 (br, 2H, —C$\underline{H}_2$—OP), 5.33, 5.69 (2s, 2H, C=CH$_2$), 8.07 (s, 1H, N$\underline{H}$)

Example 1: Zwitterionic Polymer

Example 1-1: MCHP Homopolymer

MCHP (0.191 g, 0.68 mmol) and AIBN (1.1 mg, 0.0068 mmol) were dissolved in a DMSO solution (0.68 mL) in a tube-shaped reactor. The mixture was degassed by bubbling nitrogen through for 30 min. The oxygen in the system was removed in the freeze-deaeration and nitrogen purge. Polymerization was carried out at 70° C. for 16 h. The resulting product was purified by cellulose dialysis tubing (3500 MWCO) against methanol for 1 day and deionized water for another 1 day, and lyophilized to give an MCHP polymer (0.0028 g, 15%).

$^1$H NMR (400 MHz, methanol-d4): δ=1.8-2.0 (br, 4H, —CH$_2$—CH$_2$—), 3.28 (br, 6H, —N$^+$(CH$_3$)$_2$—), 3.74 (br, 2H, —N$^+$(CH$_3$)$_2$—C$\underline{H}_2$—CH$_2$—OP), 3.85 (br, 2H, —O—CH$_2$—C$\underline{H}_2$—N), 4.31 (br, 2H, —CH$_2$—OP), 4.547 (br, 2H, —O—C$\underline{H}_2$—)

Example 1-2: MCHP-BMA (butyl methacrylate) copolymer

An MCHP-BMA copolymer (p(MCHP-co-BMA)) was obtained in the same manner as in Example 1-1, except that a monomer mixture of MCHP and BMA in a molar ratio of 40:60 was used instead of MCHP. In the obtained MCHP-BMA copolymer, the molar ratio of the MCHP unit and the BMA unit was 13:87.

$^1$H NMR (400 MHz, methanol-d4): δ=0.959 (br, 3H, C$\underline{H}_3$—CH$_2$—), 1.42 (br, 2H, CH$_3$—C$\underline{H}_2$—CH$_2$—), 1.63 (br, 2H, —CH$_2$—C$\underline{H}_2$—CH$_2$—), 3.28 (br, 6H, —N$^+$(CH$_3$)$_2$—), 3.74 (br, 2H, —N$^+$(CH$_3$)$_2$—C$\underline{H}_2$—CH$_2$—OP), 3.85 (br, 2H, —O—CH$_2$—C$\underline{H}_2$—N), 3.97 (br, 2H, —CH$_2$—CH$_2$—O—), 4.31 (br, 2H, —C$\underline{H}_2$—OP), 4.48 (br, 2H, —O—CH$_2$—)

Example 1-3: MCHP-BMA Copolymer and MCHP-DI (dimethyl itaconate) Copolymer

An MCHP-BMA copolymer with an MCHP unit and BMA unit in a molar ratio of 22:78 or 29:71, and an MCHP-DI copolymer (p(MCHP-co-DI)) with an MCHP unit and DI unit in a molar ratio of 18:82 were produced in the same manner as in Example 1-2.

Specifically, MCHP (0.6 mmol), AIBN (0.06 mmol), and BMA (2.4 mmol) were dissolved in anhydrous ethanol (8 mL) in a side-arm flask after $N_2$ replacement, the temperature was raised to 70° C. to allow the reaction to proceed for 24 h. The resulting copolymer was dissolved in methanol, purified by cellulose dialysis tubing (3500 MWCO), dissolved in ethanol, and precipitated in hexane to give an MCHP-BMA copolymer with an MCHP unit and BMA unit in a molar ratio of 22:78.

The MCHP-BMA copolymer with an MCHP unit and BMA unit in a molar ratio of 29:71 was produced in the same manner as above, except that MCHP (0.9 mmol) and BMA (2.1 mmol) were used.

The MCHP-DI copolymer with an MCHP unit and DI unit in a molar ratio of 18:82 was produced in the same manner as above, except that DI was used instead of BMA, and a mixture of deionized water:methanol=4:6 (by volume) was used instead of anhydrous ethanol.
$^1$H NMR (500 MHz, methanol-d4): δ=1.2-1.5 (br, 2H, —C—CH$_2$—C—), 3.24 (br, 6H, —N$^+$(CH$_3$)$_2$—), 3.62 (br, 3H, —O—CH$_3$), 3.74 (br, 2H, —N$^+$(CH$_3$)$_2$—CH$_2$—CH$_2$—OP), 4.26 (br, 2H, —CH$_2$—OP), 4.34 (br, 2H, —O—CH$_2$—)

As controls, a BMA homopolymer (p(BMA)), an MPC-BMA copolymer (p(MPC-co-BMA)) with an MPC unit and BMA unit in a molar ratio of 29:71, and a DI homopolymer (p(DI)) were produced in the same manner as above.

Example 2: Film

A 0.1 g/mL of a polymer solution (solvent: ethanol) was prepared using the polymer obtained in Example 1-1 or 1-2, and the polymer solution was cast onto a glass substrate and dried at room temperature for 1 day to form a film. Further, a 40 mg/mL of a polymer solution (solvent: ethanol) was prepared using the polymer obtained in Example 1-3, and the polymer solution was cast onto a glass substrate and dried at room temperature for 1 day to form a film.

Example 3: Polymer Brush (SI-ATRP)

Glass wafers were cut into 1.0 cm×2.0 cm pieces, cleaned by sonication with ethanol, water, acetone, and ethanol in this order for 5 minutes each, and etched with oxygen plasma for 10 min.

(3-Trimethoxysilyl)propyl 2-bromo-2-methylpropionate (TSBM) (0.045 mmol, 0.012 mL) was used as an initiator to form a homogeneous monolayer of the initiator on the glass wafers.

A modifier (MPC (trade name: 2-methacryloyloxyethyl phosphorylcholine, produced by Tokyo Chemical Industry Co., Ltd.), MCHP, or MACHP) (3 mmol), a glass wafer with a TSBM monolayer, copper(I) bromide (0.12 mmol, 0.017 g), and 2,2'-bipyridyl (0.3 mmol, 0.047 g) were placed in a 200-mL side-arm flask, and the atmosphere was replaced by a nitrogen atmosphere. Methanol and water (methanol:water=1:1) as solvents, and then ethyl 2-bromoisobutyrate (EBIB) (0.12 mmol, 0.018 mL) were added to the flask, and the mixture was shaken at room temperature for 24 h to give an MPC-modified glass wafer (Si-p(MPC)), MCHP-modified glass wafer (Si-p(MCHP)), and MACHP-modified glass wafer (Si-p(MACHP)).

Test Example 1: Raman Spectrum

The Raman spectra of a slide glass, the glass wafer with a TSBM monolayer (simply referred to as "TSBM"), the Si-p(MCHP), and Si-p(MPC) were measured with a laser Raman spectrometer (uRaman-532, produced by TechnoSpex Pte Ltd.). FIG. 1 shows the results.

For the Si-p (MPC), a peak was observed at 1090 cm$^{-1}$. This peak represents the symmetric stretching vibration of O—P—O in MPC.

For the Si-p (MCHP), a peak was observed at 917 cm$^{-1}$. This peak represents the PO stretching vibration of P—O—H in MCHP.

For the TSBM, the peak at 582 cm$^{-1}$ was attributable to C—Br.

Test Example 2: Contact Angle (WCA)

The contact angle of water or buffer solution droplet on the slide glass (SG), TSBM, Si-p(MPC), Si-p(MCHP), and Si-p(MACHP) were measured using an automatic contact angle meter (DMe-201, produced by Kyowa Interface Science Co., Ltd.) as follows.

The contact angle of water was measured at room temperature using Milli-Q water droplet (droplet amount: 5 μL).

Buffers were prepared according to the following table, and the contact angle of buffers was measured at room temperature using the buffers solution droplet (droplet amount: 5 μL).

TABLE 1

| pH | Buffer | Formulation |
|---|---|---|
| 1.0 | KCl—HCl buffer | 0.1M KCl (5 mL) + 0.1M HCl (9.70 mL) |
| 1.4 | | 0.1M KCl (5 mL) + 0.1M HCl (4.15 mL) |
| 1.8 | | 0.1M KCl (5 mL) + 0.1M HCl (1.66 mL) |
| 2.2 | McIlvaine buffer | 0.2M Na$_2$HPO$_4$ (0.40 mL) + 0.1M citric acid (19.60 mL) |
| 2.6 | | 0.2M Na$_2$HPO$_4$ (2.18 mL) + 0.1M citric acid (17.82 mL) |
| 3.8 | | 0.2M Na$_2$HPO$_4$ (7.10 mL) + 0.1M citric acid (12.9 mL) |
| 5.0 | | 0.2M Na$_2$HPO$_4$ (10.30 mL) + 0.1M citric acid (9.70 mL) |
| 6.2 | | 0.2M Na$_2$HPO$_4$ (12.63 mL) + 0.1M citric acid (7.37 mL) |
| 7.4 | PBS | NaCl (800 mg) + KCl (20 mg) + Na$_2$HPO$_4$ (144 mg) + KH$_2$PO$_4$ (24 mg) + Milli-Q water (100 mL) |
| 8.8 | CBS | 0.1M Na$_2$CO$_3$ (10 mL) + 0.1M NaHCO$_3$ (90 mL) |
| 10.2 | | 0.1M Na$_2$CO$_3$ (80 mL) + 0.1M NaHCO$_3$ (20 mL) |

FIG. 2 shows the measurement results of contact angle against water, and FIG. 3 shows the measurement results of contact angle against buffers.

Although the static water contact angle of the slide glass was about 46.3°, the static water contact angle of the Si-p(MPC) and Si-p(MCHP) were about 37.8° and 22.7°, respectively, and the Si-p(MPC) and Si-p(MCHP) were thus more hydrophilic than the slide glass. These results indicate that the Si-p(MCHP) has an extremely hydrophilic surface under aqueous conditions.

The measurement results of the contact angle against buffers indicate that the Si-p(MCHP) and Si-p(MACHP) were more hydrophilic and constant at various pH values than the slide glass, Si-p(TSBM), and Si-p(MPC). For example, the contact angle of the Si-p(MPC) significantly changed (increased) as the pH decreased from 3.8 to 1.0, whereas the contact angle of the Si-p(MCHP) and Si-p (MACHP) showed almost no change.

Test Example 3: Protein Adsorption

A solution containing 2 mg/ml of protein (fibrinogen) in 0.1M sodium carbonate buffer at pH 9.0 was prepared. Separately from this, FITC (fluorescein isothiocyanate) was dissolved in DMSO such that the concentration was 1 mg/mL. While the protein solution was gently stirred, 50 μL of the FITC solution was added per 1 mL of the protein solution to obtain a 5 mL aliquot. After the required amount of the FITC solution was added, the reaction was incubated in the dark at 4° C. for 8 h. Dialysis was performed twice overnight at 0 to 5° C. using PBS at pH 7.4 and dialysis membranes (Dialysis Membrane, size 27, produced by FUJIFILM Wako Pure Chemical Corporation) to obtain an FITC-labeled fibrinogen PBS solution. Further, an FITC-labeled fibrinogen McIlvaine buffer solution was obtained in the same manner as above using McIlvaine buffer at pH 2.8 instead of PBS at pH 7.4.

Comparison Between Si-p(MPC) and Si-p(MCHP) at pH 7.4

Figure 4:
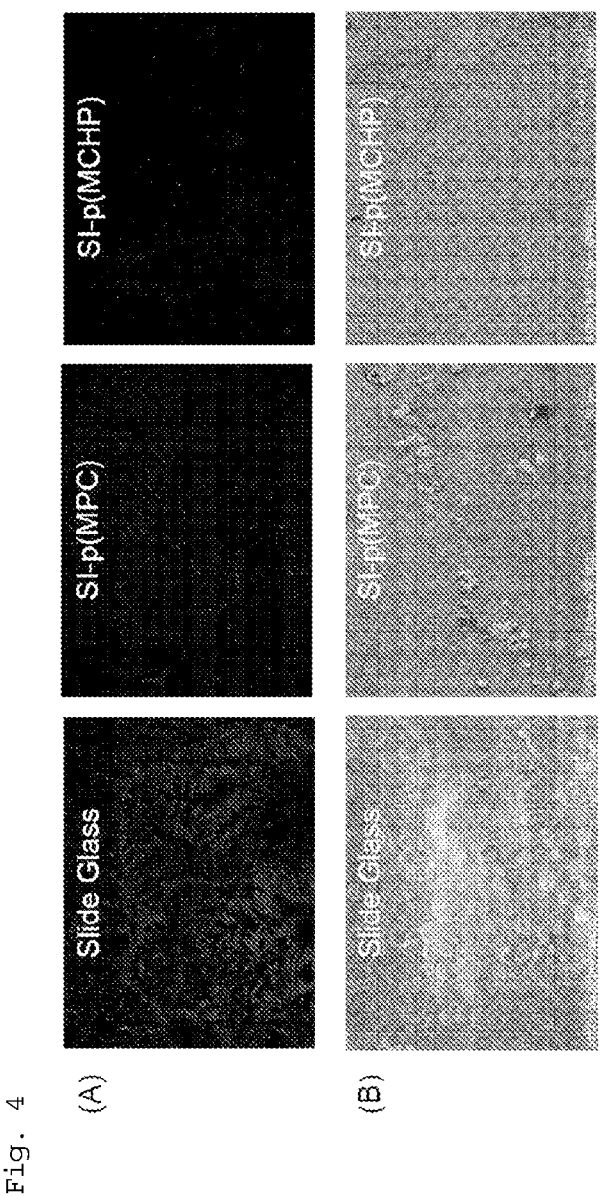
FIG. 4 (Panels A and B) are micrographs showing that the polymer brushes of the Examples have an excellent protein adsorption inhibitory effect.
Figure 5:
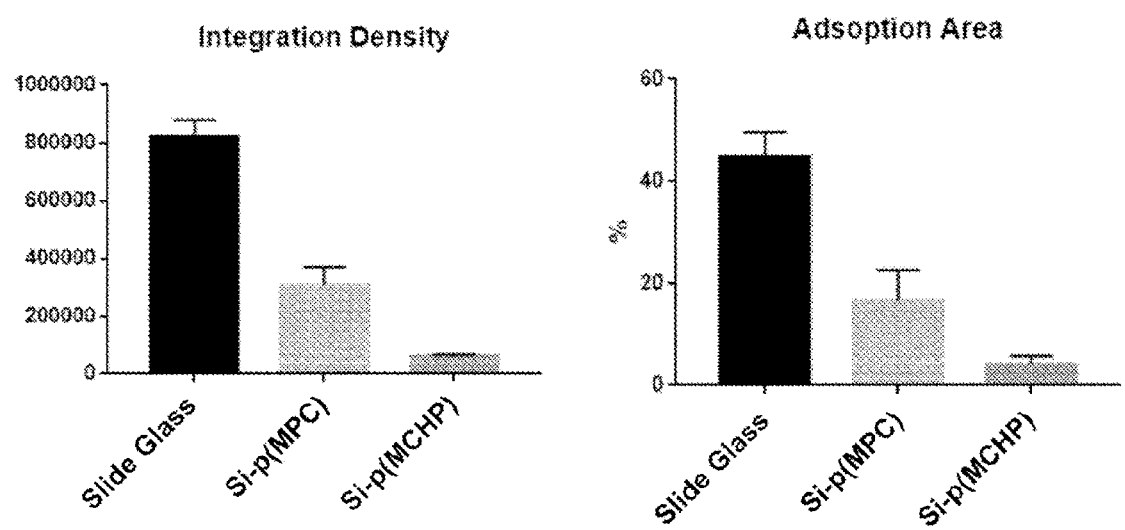
FIG. 5 are graphs quantifying the protein adsorption inhibitory effect of the polymer brushes of the Examples.

The slide glass, Si-p(MPC), and Si-p(MCHP) were sonicated with PBS at pH 7.4 and incubated overnight in 5% $CO_2$ at 37° C. The resulting products were incubated for 60 min in the FITC-labeled fibrinogen PBS solution obtained above, washed with PBS, and observed under fluorescence microscope. The images observed under fluorescence microscope are shown in FIG. 4(A), and the fluorescence intensity (corresponding to the protein adsorption amount) is shown in FIG. 5.

The adsorbed protein was modified using 75% alcohol and observed under scanning electron microscopy (SEM). The SEM images are shown in FIG. 4(B), and the protein adsorption area is shown in FIG. 5.

The protein adsorption amount on the slide glass was significantly greater than the protein adsorption amount on the Si-p(MCHP) or Si-p(MPC). The protein adsorption area on the slide glass was also significantly greater than the protein adsorption area on the Si-p(MCHP) or Si-p(MPC). The results indicate that the Si-p(MCHP) had the smallest protein adsorption amount and had an adsorption area as low as about 5%, and thus had excellent biocompatibility.

Comparison Between Si-p(MPC) and Si-p(MCHP) at pH 2.8

Figure 6:
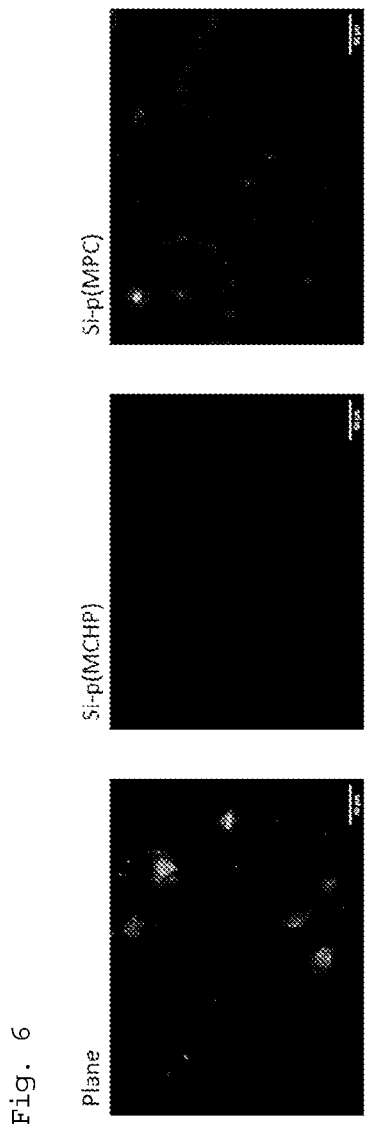
FIG. 6 are micrographs showing that the polymer brushes of the Examples have an excellent protein adsorption inhibitory effect at pH 2.8.
Figure 7:
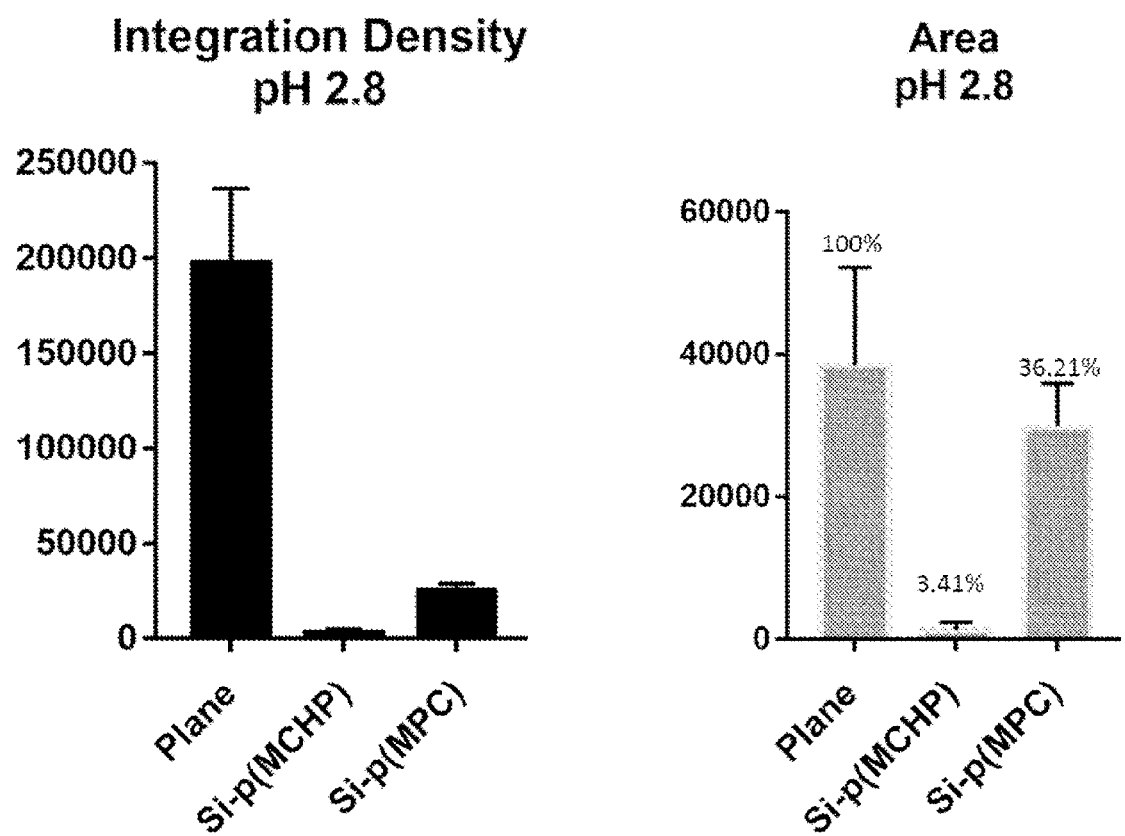
FIG. 7 are graphs quantifying the protein adsorption inhibitory effect of the polymer brushes of the Examples at pH 2.8.

Glass (Plane), the Si-p(MPC), and Si-p(MCHP) were sonicated with McIlvaine buffer at pH 2.8 and incubated overnight in 5% $CO_2$ at 37° C. The resulting products were incubated for 60 min in the FITC-labeled fibrinogen McIlvaine buffer solution obtained above, washed with PBS, and observed under fluorescence microscope. The images observed under fluorescence microscope are shown in FIG. 6, and the fluorescence intensity and protein adsorption area are shown in FIG. 7.

Comparison Between P(BMA) and p(MCHP-co-BMA)

Figure 9:
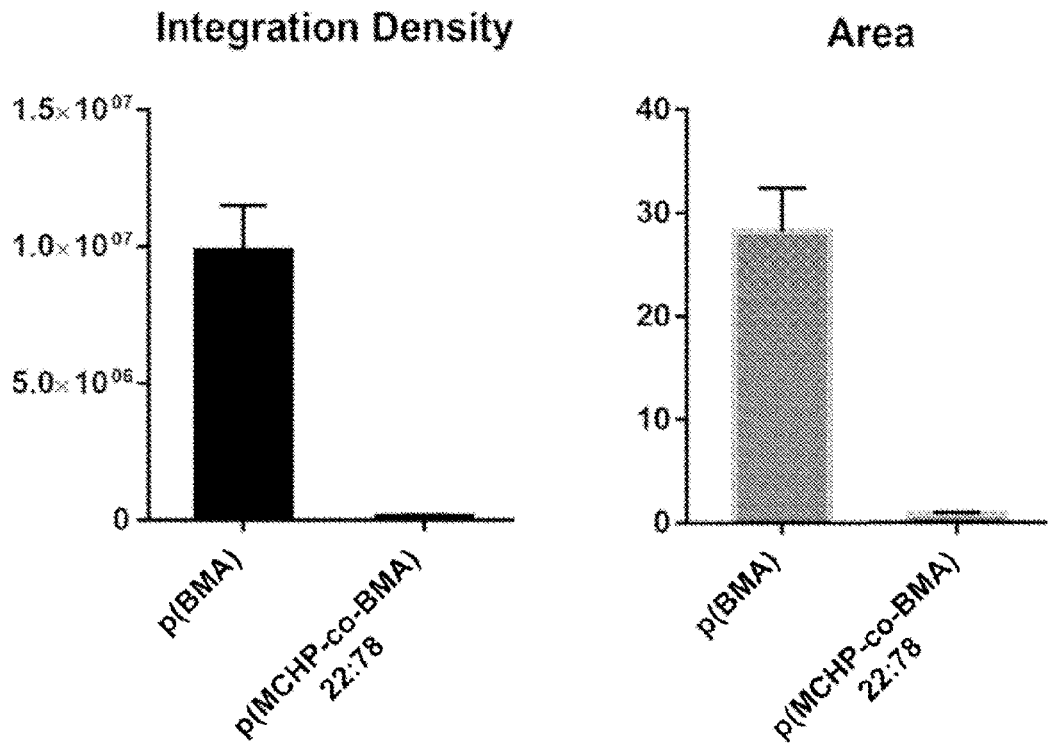
FIG. 9 are graphs quantifying the protein adsorption inhibitory effect of the films of the Examples.

Glass having the p(MCHP-co-BMA) film obtained in Example 2 on the surface and glass having the p(BMA) film on the surface as a control were subjected to the protein adsorption test in the same manner as above. The images observed under fluorescence microscope are shown in FIG. 8, and the fluorescence intensity and protein adsorption area are shown in FIG. 9.

The results indicate that the p(MCHP-co-BMA) film had a significantly smaller protein adsorption amount and a smaller protein adsorption area than those of the p(BMA) film, and thus had excellent biocompatibility.

Comparison Between P(MPC-co-BMA) and p(MCHP-co-BMA) and Comparison Between p(DI) and p(MCHP-co-DI)

Figure 10:
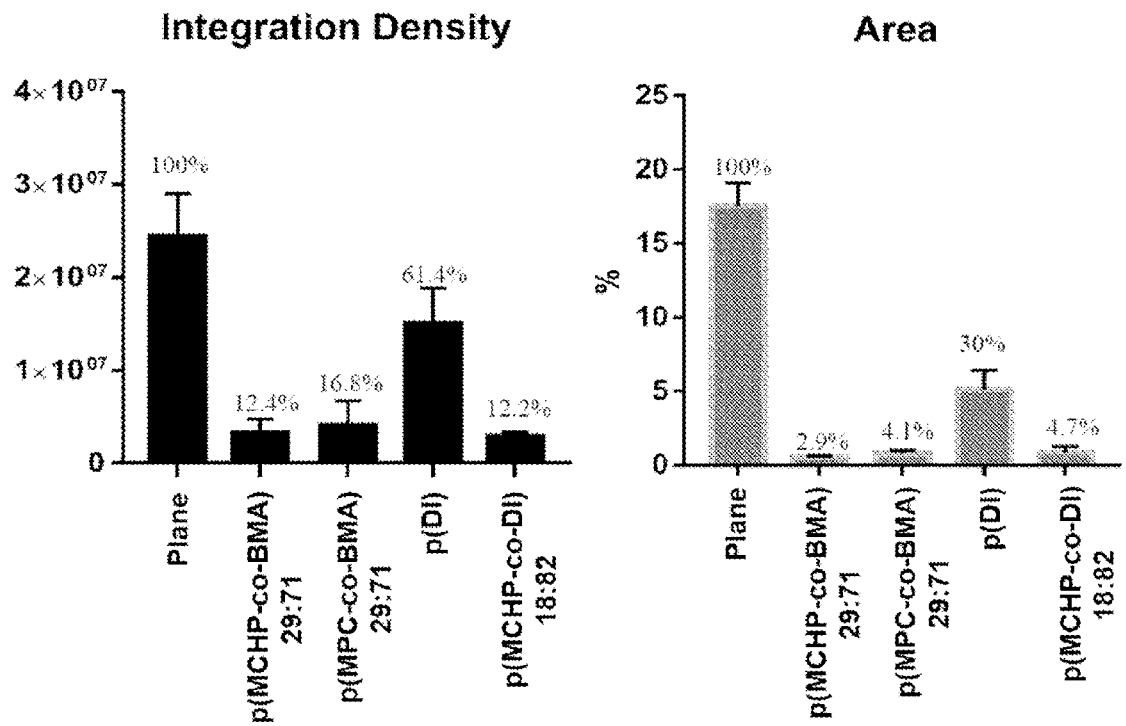
FIG. 10 are graphs quantifying the protein adsorption inhibitory effect of the films of the Examples.

Glass having the p(MCHP-co-BMA) film obtained in Example 2 on the surface, glass having the p(MCHP-co-DI) film on the surface, glass having the p(BMA) film on the surface (control), and glass having the p(DI) film on the surface (control) were subjected to the protein adsorption test in the same manner as above. The fluorescence intensity and protein adsorption area are shown in FIG. 10.

The results indicate that the p(MCHP-co-BMA) film had a reduced protein adsorption amount and a reduced adsorption area, compared with the p(MPC-co-BMA) film, and thus had excellent biocompatibility. The results also indicate that the use of DI as the additional monomer for copolymerization instead of BMA could also reduce the protein adsorption amount and adsorption area, demonstrating excellent biocompatibility.

The invention claimed is:

1. A polymer comprising a unit represented by the following formula (1):

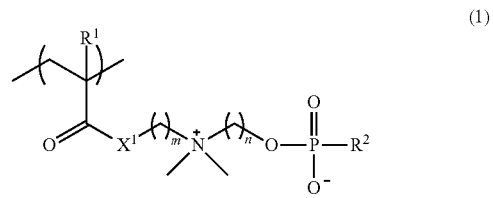

wherein $R^1$ is a hydrogen atom or a methyl group, $R^2$ is OH or $O^-$, $X^1$ is —O— or —N($Q^1$)-, $Q^1$ is a hydrogen atom or a $C_{1-6}$ alkyl group, m is an integer of 1 to 12, and n is an integer of 1 to 4, (i) wherein the percentage of the unit is more than 90 mol % based on the total monomer units, or (ii) wherein the polymer further comprises a unit represented by the following formula (2):

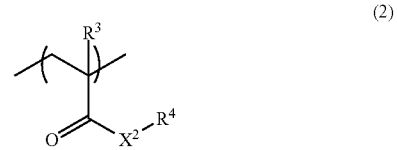

wherein $R^3$ is —CO—$X^2$—$R^4$ or —$CH_2$—CO—$X^2$—$R^4$, and $R^4$ is a $C_{1-16}$ alkyl group, $X^2$ is —O— or —N($Q^2$)-, and $Q^2$ is a hydrogen atom or a $C_{1-6}$ alkyl group, and wherein the molar ratio of the unit represented by formula (1) and the unit represented by formula (2) is 10:90 to 35:65.

2. A film or sheet containing a polymer comprising a unit represented by the following formula (1):

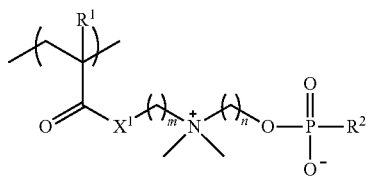

(1)

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
(i) wherein the percentage of the unit is more than 90 mol % based on the total monomer units, or
(ii) wherein the polymer further comprises a unit represented by the following formula (2):

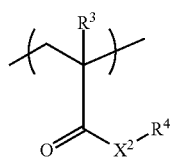

(2)

wherein
$R^3$ is a hydrogen atom or a methyl group, and $R^4$ is a $C_{3-16}$ alkyl group, or
$R^3$ is —CO—$X^2$—$R^4$ or —CH$_2$—CO—$X^2R^4$, and $R^4$ is a $C_{1-16}$ alkyl group,
$X^2$ is —O— or —N($Q^2$)-, and
$Q^2$ is a hydrogen atom or a $C_{1-6}$ alkyl group, and
wherein the molar ratio of the unit represented by formula (1) and the unit represented by formula (2) is 10:90 to 35:65.

3. A method for imparting biocompatibility to a material or enhancing biocompatibility of a material, the method comprising applying to a surface of the material a polymer comprising a unit represented by the following formula (1):

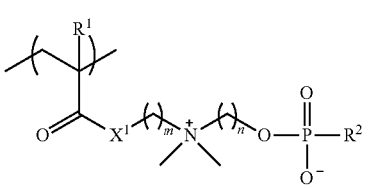

(1)

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
(i) wherein the percentage of the unit is more than 90 mol % based on the total monomer units, or
(ii) wherein the polymer further comprises a unit represented by the following formula (2):

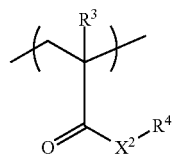

(2)

wherein
$R^3$ is a hydrogen atom or a methyl group, and $R^4$ is a $C_{3-16}$ alkyl group, or
$R^3$ is —CO—$X^2$—$R^4$ or —CH$_2$—CO—$X^2R^4$, and $R^4$ is a $C_{1-16}$ alkyl group,
$X^2$ is —O— or —N($Q^2$)-, and
$Q^2$ is a hydrogen atom or a $C_{1-6}$ alkyl group, and
wherein the molar ratio of the unit represented by formula (1) and the unit represented by formula (2) is 10:90 to 35:65.

4. The method according to claim 3, wherein the material is a surface-covering material for a medical material.

5. A method for imparting biocompatibility to a material or enhancing biocompatibility of a material, the method comprising applying to a surface of the material a polymer comprising a unit represented by the following formula (1):

(1)

wherein
$R^1$ is a hydrogen atom or a methyl group,
$R^2$ is OH or $O^-$,
$X^1$ is —O— or —N($Q^1$)-,
$Q^1$ is a hydrogen atom or a $C_{1-6}$ alkyl group,
m is an integer of 1 to 12, and
n is an integer of 1 to 4,
wherein the material is a liquid for preserving contact lens, a surface-modifying material for a diagnostic medical device, a cell culture sheet, a material for preserving blood, a protein or a cell, a material for protein anticoagulation, a moisturizer, or a material for a facial mask.

* * * * *